United States Patent
Fujimoto et al.

(10) Patent No.: US 12,033,194 B2
(45) Date of Patent: Jul. 9, 2024

(54) RIDESHARING MANAGEMENT DEVICE, RIDESHARING MANAGEMENT METHOD, AND PROGRAM

(71) Applicant: HONDA MOTOR CO., LTD., Tokyo (JP)

(72) Inventors: Naotoshi Fujimoto, Wako (JP); Yo Ito, Tokyo (JP); Susumu Iwamoto, Tokyo (JP); Seiichi Yamamoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1214 days.

(21) Appl. No.: 16/621,465

(22) PCT Filed: Jun. 15, 2018

(86) PCT No.: PCT/JP2018/022824
§ 371 (c)(1),
(2) Date: Dec. 11, 2019

(87) PCT Pub. No.: WO2018/230676
PCT Pub. Date: Dec. 20, 2018

(65) Prior Publication Data
US 2020/0175558 A1    Jun. 4, 2020

(30) Foreign Application Priority Data

Jun. 15, 2017    (JP) ................. 2017-117723

(51) Int. Cl.
*G06Q 10/02*    (2012.01)
*G01C 21/34*    (2006.01)
(Continued)

(52) U.S. Cl.
CPC ..... *G06Q 30/0284* (2013.01); *G01C 21/3438* (2013.01); *G01C 21/3453* (2013.01);
(Continued)

(58) Field of Classification Search
CPC .... G06Q 30/0284; G06Q 10/02; G06Q 50/30; G06Q 50/40
See application file for complete search history.

(56) References Cited

U.S. PATENT DOCUMENTS

| | | | |
|---|---|---|---|
| 2010/0138246 A1* | 6/2010 | Carey | G06Q 10/02 705/7.18 |
| 2012/0239584 A1* | 9/2012 | Yariv | G01C 21/3438 701/302 |

(Continued)

FOREIGN PATENT DOCUMENTS

| | | |
|---|---|---|
| JP | 2003-006294 | 1/2003 |
| JP | 2004-062490 | 2/2004 |

(Continued)

OTHER PUBLICATIONS

Stiglic, Mitja, et al., "The benefits of meeting points in ride-sharing systems", 2015, Transportation Research Part B: Methodological, vol. 82, pp. 36-53 (Year: 2015).*

(Continued)

*Primary Examiner* — Jeff Zimmerman
*Assistant Examiner* — Wayne S. Murray
(74) *Attorney, Agent, or Firm* — Amin, Turocy & Watson, LLP

(57) ABSTRACT

A ridesharing management device includes: a communicator configured to communicate with a plurality of terminal devices used by a plurality of users; an acquirer configured to acquire pick-up requests of the plurality of users in which a use condition including at least a desired pick-up place is defined; and a service manager configured to perform a grouping process of grouping users associated with the use condition and an allocating process of allocating a vehicle which is able to be used by the grouped users according to the use condition included in the pick-up request and configured to determine a pick-up place at which the allocated (Continued)

vehicle is picked up so that the grouped users are able to be assembled according to results of the grouping process and the allocating process.

14 Claims, 20 Drawing Sheets

(51) Int. Cl.
*G06Q 10/047* (2023.01)
*G06Q 30/0283* (2023.01)
*G06Q 50/40* (2024.01)
*G08G 1/00* (2006.01)

(52) U.S. Cl.
CPC ........... *G06Q 10/02* (2013.01); *G06Q 10/047* (2013.01); *G06Q 50/40* (2024.01); *G08G 1/202* (2013.01)

(56) References Cited

U.S. PATENT DOCUMENTS

2013/0041941 A1* 2/2013 Tomasic ................. G01C 21/20
709/203
2015/0324945 A1* 11/2015 Lord ..................... G06Q 10/047
705/7.13
2017/0059347 A1* 3/2017 Flier ................. G06Q 10/08355
2018/0238694 A1* 8/2018 Bellotti .............. G01C 21/3438

FOREIGN PATENT DOCUMENTS

| | | |
|---|---|---|
| JP | 2009-289192 | 12/2009 |
| JP | 2010-067061 | 3/2010 |
| JP | 2015-191364 | 11/2015 |
| JP | 2016-091411 | 5/2016 |
| JP | 2016-157185 | 9/2016 |

OTHER PUBLICATIONS

Japanese Notice of Allowance for Japanese Patent Application No. 2020-007769 dated Aug. 23, 2022.
International Search Report and Written Opinion for International Application Serial No. PCT/JP2018/022824 dated Aug. 7, 2018, 6 pages.

* cited by examiner

| USER ID | DESIRED BOARDING PLACE | DESTINATION | DESIRED BOARDING TIME | POSITIONAL INFORMATION | MOVEMENT METHOD | ALLOCATE FLAG |
|---|---|---|---|---|---|---|
| 0001 | (,) | (,) | 2017/04/30/10:20 | (,) | TRAIN, ON FOOT | 1 |
| 0002 | (,) | (,) | 2017/05/2/15:00 | (,) | BUS | 0 |
| ... | ... | ... | ... | ... | ... | ... |

| PICK-UP PLACE ID | POSITION | CONTENT OF PICK-UP PLACE |
|---|---|---|
| A | (**, **) | ROTARY IN FRONT OF STATION |
| B | (**, **) | CONVENIENCE STORE |
| ... | ... | ... |

| VEHICLE ID | | DEPARTURE PLACE (GARAGE) | TRANSIT PLACE (1) | TRANSIT PLACE (2) | ... | TRANSIT PLACE (n-1) | TRANSIT PLACE (n) | ARRIVAL PLACE (GARAGE) |
|---|---|---|---|---|---|---|---|---|
| | COORDINATES | (,) | (,) | (,) | ... | (,) | (,) | (,) |
| M-1 | ESTIMATED TIME OF ARRIVAL | 2017/04/30 10:00 | 2017/04/30 10:30 | 2017/04/30 11:00 | ... | 2017/04/30 16:30 | 2017/04/30 16:45 | 2017/04/30 18:00 |
| | USER GETTING INTO | – | 0001 | 0004 | ... | – | – | – |
| | USER GETTING OUT OF | – | – | – | ... | 0004 | 0001 | – |
| | COORDINATES | ⋮ | ⋮ | ⋮ | ... | ⋮ | ⋮ | ⋮ |
| M-2 | ESTIMATED TIME OF ARRIVAL | ⋮ | ⋮ | ⋮ | ... | ⋮ | ⋮ | ⋮ |
| | USER GETTING INTO | ⋮ | ⋮ | ⋮ | ... | ⋮ | ⋮ | ⋮ |
| | USER GETTING OUT OF | ⋮ | ⋮ | ⋮ | ... | ⋮ | ⋮ | ⋮ |
| ... | | | | | | | | |

| USER ID | DESIRED PICK-UP PLACE | DESTI- NATION | DESIRED PICK-UP TIME | POSITIONAL INFORMATION | MOVEMENT METHOD | PLANNED MOVEMENT DISTANCE | NUMBER OF PEOPLE | SERVICE CLASSIFI- CATION | STANDARD FEE | ALLOCATE FLAG |
|---|---|---|---|---|---|---|---|---|---|---|
| 0001 | (, ) | (, ) | 2017/04/30/ 10:20 | (, ) | TRAIN, ON FOOT | **m | *PEOPLE | PEOPLE | **YEN | 1 |
| 0002 | (, ) | (, ) | 2017/05/2/ 15:00 | (, ) | BUS | **m | *PEOPLE | FREIGHT | **YEN | 0 |
| ... | ... | ... | ... | ... | ... | ... | ... | ... | ... | ... |

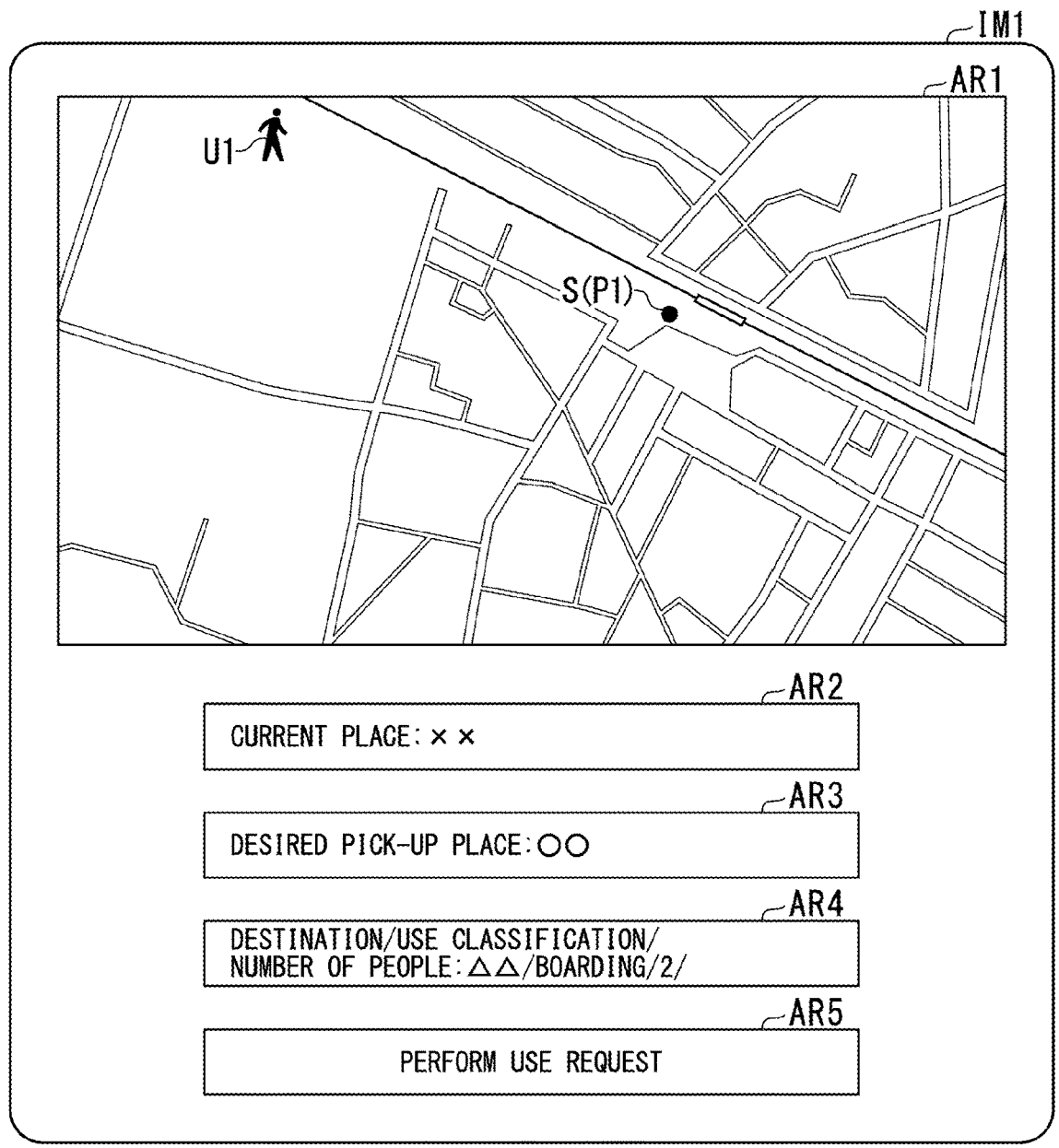

RIDESHARING MANAGEMENT DEVICE, RIDESHARING MANAGEMENT METHOD, AND PROGRAM

TECHNICAL FIELD

The present invention relates to a ridesharing management device, a ridesharing management method, and a program.

Priority is claimed on Japanese Patent Application No. 2017-117723, filed Jun. 15, 2017, the content of which is incorporated herein by reference.

BACKGROUND ART

In the related art, the invention of a vehicle sharing support device for allowing a plurality of users to use the same shared vehicle was disclosed (see Patent Document 1). This device includes a database storage that stores user information and road information, an estimation processor that estimates a traveling route along which a shared vehicle travels from a departure place indicated by departure place designation information to an arrival place indicated by arrival place designation information according to the received departure place designation information and arrival place designation information from each of user portable terminals, the road information stored in the database storage, and current positional information from a current vehicle position acquirer, and a selection processor that searches for a plurality of users who are ridesharing targets for boarding a shared vehicle according to the estimated traveling route for respective users, selects a plurality of waiting places according to ease of arrival when the shared vehicle arrives at a waiting place at the time of ridesharing and ease of waiting, and gives priority to a plurality of selected waiting places.

CITATION LIST

Patent Literature

[Patent Document 1]
Japanese Unexamined Patent Application, First Publication No. 2003-6294

SUMMARY OF INVENTION

Technical Problem

In the technology of the related art, no consideration has been given to grouping a plurality of users together, and there may be cases in which efficient administration may not be possible.

The present invention is devised in view of such circumstances and an object of the present invention is to provide a ridesharing management device, a ridesharing management method, and a program capable of realizing more efficient administration.

Solution to Problem (1) A ridesharing management device includes: a communicator configured to communicate with a plurality of terminal devices used by a plurality of users; an acquirer configured to acquire pick-up requests of the plurality of users in which a use condition including at least a desired pick-up place is defined; and a service manager configured to perform a grouping process of grouping users associated with the use condition and an allocating process of allocating a vehicle which is able to be used by the grouped users according to the use condition included in the pick-up request and configured to determine a pick-up place at which the allocated vehicle is picked up so that the grouped users are able to be assembled according to results of the grouping process and the allocating process.

(2) In the ridesharing management device in (1), the service manager may determine the pick-up place by deriving indexes indicating a cost incurred for the grouped users to arrive at candidate places and comparing the indexes for candidate places with one another.

(3) In the ridesharing management device in (1) or (2), the service manager may perform the grouping process according to the desired pick-up place of the plurality of users and a desired pick-up time included in the use condition.

(4) In the ridesharing management device in any one of (1) to (3), the service manager may set a base user who serves as a standard among the plurality of users, estimate a time necessary for the base user to arrive at the desired pick-up place included in the use condition of the base user, and group the users according to the estimated time.

(5) In the ridesharing management device in (4), the service manager may estimate an estimated time of arrival at which the grouped users arrive at the desired pick-up place and perform the process of allocating the vehicle which is able to be used by the user according to the estimated time of arrival.

(6) In the ridesharing management device in any one of (1) to (5), the communicator may communicate with the vehicle. The acquirer may acquire positional information of the user. The service manager may estimate an arrival situation at the desired pick-up place according to the positional information of the user acquired by the acquirer, extract a vehicle candidate which is able to be used by the user according to the estimated arrival situation, and transmit updated information according to a variation in the positional information of the user to the user using the communicator.

(7) In the ridesharing management device in any one of (1) to (6), the communicator may communicate with the vehicle. The acquirer may acquire positional information of the user and positional information of the allocated vehicle. The service manager may update the pick-up place and a planned time of arrival of the vehicle according to the positional information of the user and the positional information of the allocated vehicle acquired by the acquirer.

(8) In the ridesharing management device in any one of (1) to (7), when a desire to use the allocated vehicle by a user without a reservation not included in a schedule of the allocated vehicle is detected, the service manager may determine whether the user without a reservation is allowed to use the allocated vehicle, and when the service manager determines that the user without a reservation is not allowed to use the allocated vehicle, the service manager may prepare another vehicle different from the allocated vehicle to correspond to the desire to use the allocated vehicle.

(9) In the ridesharing management device in (1), a service classification and a destination used by the user may be defined in the use condition. The ridesharing management device may further include: a service classification determiner configured to determine a service classification according to the pick-up request; and a usage cost determiner configured to determine a usage cost of a service to be provided to the user according to the desired pick-up place, the destination, and the service classification.

(10) The ridesharing management device in (9) may further include a service provider determiner configured to determine a service provider that is configured to provide a service to the user according to the service classification and an order presenter configured to present order information for requesting the service provider to order provision of the service. The usage cost determiner may correct the usage cost according to desired order reception information presented by the service provider in accordance with the order information.

(11) In the ridesharing management device in (10), the service provider determiner may determine the service provider with reference to the desired order reception information presented by the service provider or incentive information related to the destination.

(12) In the ridesharing management device in any one of (1) to (8), the vehicle may be an automated driving vehicle.

(13) A ridesharing management method causes a computer to: communicate with a plurality of terminal devices used by a plurality of users; acquire pick-up requests of the plurality of users in which a use condition including at least a desired pick-up place is defined; perform a grouping process of grouping users associated with the use condition and an allocating process of allocating a vehicle which is able to be used by the grouped users according to the use condition included in the pick-up request; and determine a pick-up place at which the allocated vehicle is picked up so that the grouped users are able to be assembled according to results of the grouping process and the allocating process.

(14) A program causes a computer to: communicate with a plurality of terminal devices used by a plurality of users; acquire pick-up requests of the plurality of users in which a use condition including at least a desired pick-up place is defined; perform a grouping process of grouping users associated with the use condition and an allocating process of allocating a vehicle which is able to be used by the grouped users according to the use condition included in the pick-up request; and determine a pick-up place at which the allocated vehicle is picked up so that the grouped users are able to be assembled according to results of the grouping process and the allocating process.

Advantageous Effects of Invention

According to (1), (3), and (12) to (14), the service manager is configured to cause the grouped users to assemble and determine the pick-up place at which the allocated vehicle is picked up according to the results of the grouping process and the allocating process, and thus it is possible to realize more efficient administration.

According to (2), by determining the candidate place with a lower cost incurred for the grouped users to arrive at the candidate place than the other candidate places as the pick-up place, it is possible to improve convenience for the users.

According to (4) and (5), since the service manager groups the users according to the time necessary for the base user to arrive at the desired access place included in the use condition of the user serving as the standard, the user can be allowed to use the allocated vehicle more efficiently.

According to (6), since the service manager transmits information regarding use of the service to the users, it is possible to improve convenience for the users.

According to (7), since the service manager changes the pick-up place according to the positional information of the users and the positional information of the allocated vehicle, it is possible to set a more appropriate pick-up place.

According to (8), even a user (who has not made a reservation) who has not transmitted a use request can use a vehicle for ridesharing. In this case, by preparing another vehicle for a user who has made a reservation, it is possible to improve convenience for a user who has not made a reservation without deterioration in convenience for a user who has made a reservation.

According to (9), since the usage cost of a service provided to the users is determined in addition to the service classification, the user can receive a desired service more appropriately.

According to (10), since the usage cost is corrected according to the desired order reception information presented by the service provider in accordance with order information, it is possible to determine a more appropriate usage cost.

According to (11), since the service provider is determined with reference to the incentive information related to the destination, it is possible to determine a provider providing a more appropriate service.

BRIEF DESCRIPTION OF DRAWINGS

FIG. 4 is a diagram showing an example of content of boarding condition information 384.

FIG. 5 is a diagram showing an example of content of pick-up place information included in map information 386.

FIG. 6 is a diagram showing an example of content of service schedule information 388.

FIG. 15 is a diagram showing an example of content of use condition information 384A.

FIG. 18 is a diagram showing an example of an image IM1.

FIG. 19 is a diagram showing another example of a use request.

DESCRIPTION OF EMBODIMENTS

Hereinafter, an embodiment of a ridesharing management device, a ridesharing management method, and a program according to the invention will be described with reference to the drawings. A ridesharing system including the ridesharing management device is an apparatus that supports shared use (ridesharing) of one or more vehicles by a plurality of users. A vehicle used for ridesharing is, for example, an automated driving vehicle for which driving operations are basically not necessary. Hereinafter, an automated driving vehicle that is used for ridesharing will be described, but a non-automated driving vehicle may be used.

First Embodiment

When a boarding request is acquired through communication from a user, the ridesharing management device retrieves a vehicle that matches a boarding condition defined in the boarding request (an available vehicle). The communication may include both data communication and voice communication, which is, phoning.

Figure 1:
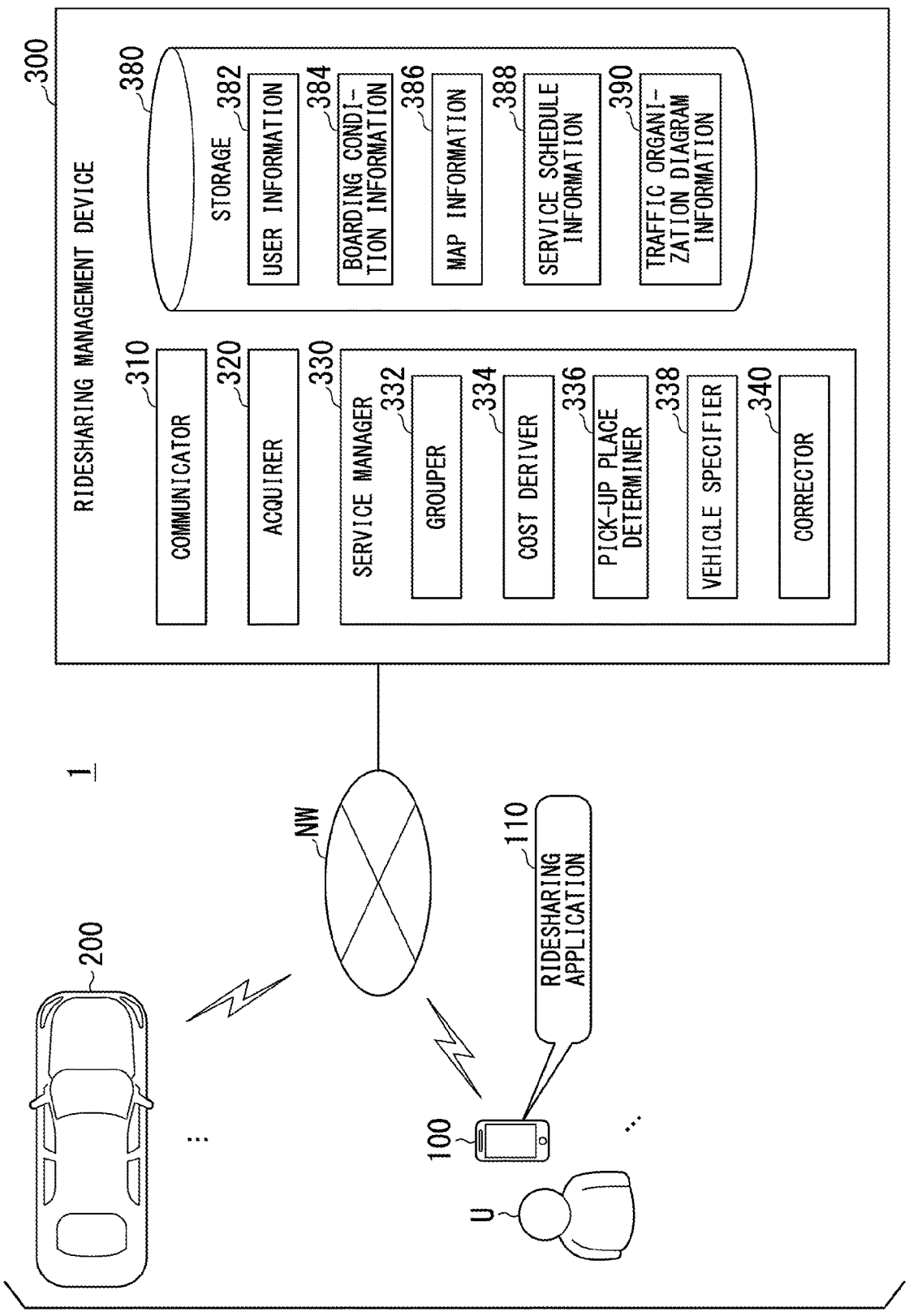
FIG. 1 is a diagram showing a configuration of a ridesharing system 1 including a ridesharing management device 300.

FIG. 1 is a diagram showing a configuration of a ridesharing system 1 including a ridesharing management device 300. The ridesharing system 1 includes one or more terminal devices 100 used by one or more users, one or more vehicles 200, and the ridesharing management device 300. These constituent elements can communicate with one another via a network NW. The network NW includes the Internet, a wide area network (WAN), a local area network (LAN), a public communication line, a provider device, a dedicated line, and a wireless base station. The "use by a user" may include temporary use of a terminal device or the like in an Internet cafe by a user U.

The terminal device 100 is, for example, a portable terminal such as a smartphone, a tablet terminal, or a personal computer which can be carried by a user. The terminal device 100 activates an application program, a browser, or the like for using the ridesharing system to support a service to be described below. In the following description, it is assumed that the terminal device 100 is a smartphone and an application program (ridesharing application 110) is activated. The ridesharing application 110 communicates with the ridesharing management device 300 in response to an operation by the user U, transmits a request of the user U to the ridesharing management device 300, or performs push communication according to information received from the ridesharing management device 300. The terminal device 100 acquires positional information specified by a position specifier of the terminal device 100 and transmits a user ID and positional information of the terminal device 100 at a predetermined interval to the ridesharing management device 300.

Figure 2:
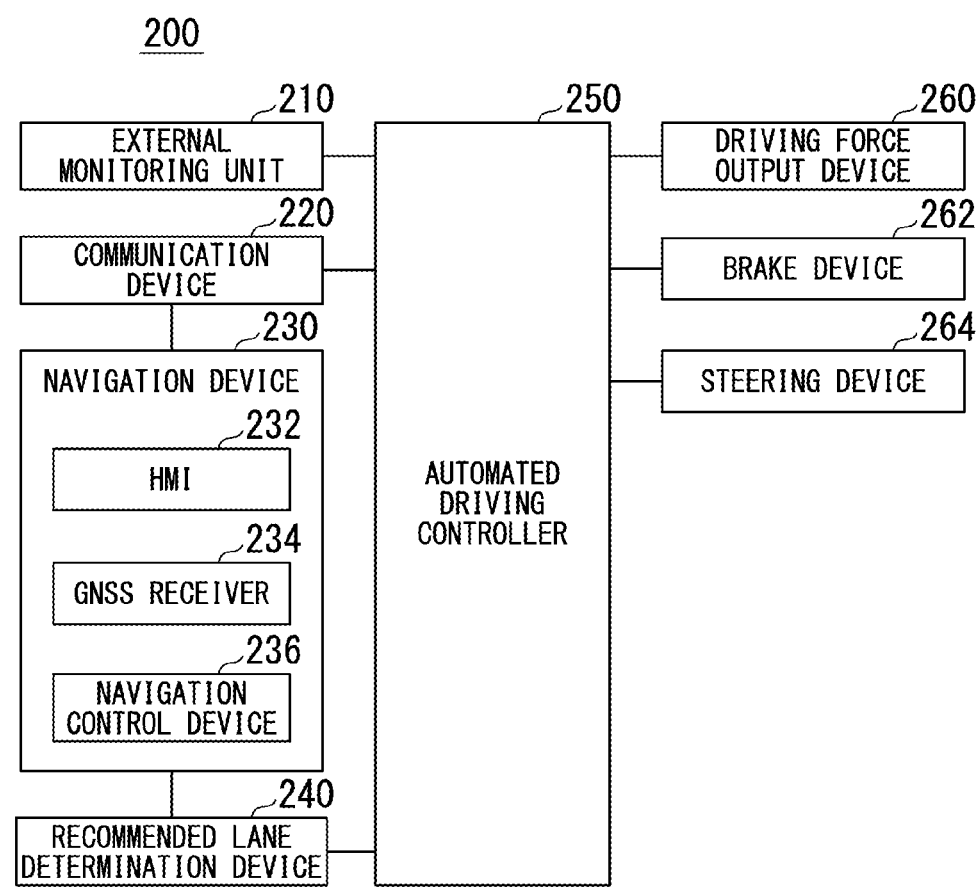
FIG. 2 is a diagram showing a configuration of a vehicle 200.

The vehicle 200 is, for example, a vehicle that has greater than or equal to four wheels and which a plurality of users U are able to board, but may be another vehicle such as a motorbike. The vehicle 200 may be a vehicle that transports luggage or may be a vehicle that transports luggage and people. FIG. 2 is a diagram showing a configuration of the vehicle 200. The vehicle 200 includes, for example, an external monitor unit 210, a communication device 220, a navigation device 230, a recommended lane determination device 240, an automated driving controller 250, a driving force output device 260, a brake device 262, a steering device 264, and a ticket authentication device 270.

The external monitor unit 210 includes, for example, a camera or a radar, a light detection and ranging (LIDAR) finder, and an object recognition device or the like that performs a sensor fusion process according to an output of the camera, the radar, or LIDAR finder. The external monitor unit 210 estimates kinds of objects (in particular, vehicles, pedestrians, and bicycles) around the vehicle 200 and outputs the kinds of objects to the automated driving controller 250 along with information regarding positions or speeds of the objects.

The communication device 220 is, for example, a wireless communication module that is connected to the network NW or directly communicates with another vehicle or a terminal device or the like of a pedestrian. The communication device 220 performs wireless communication according to Wi-Fi, dedicated short range communications (DSRC), Bluetooth (registered trademark), or another communication standard. The plurality of communication devices 220 may be prepared in accordance with purposes.

The navigation device 230 includes, for example, a human machine interface (HMI) 232, a global navigation satellite system (GNSS) receiver 234, and a navigation control device 236. The HMI 232 includes, for example, a touch panel display device, a speaker, and a microphone. The GNSS receiver 234 determines an own position (the position of the vehicle 200) according to radio waves arriving from GNSS satellites (for example, GPS satellites). The navigation control device 236 includes, for example, a central processing unit (CPU) and various storage devices and performs overall control of the navigation device 230. A storage device stores map information (a navigation map). The navigation map is a map in which roads are indicated using nodes and links. The navigation control device 236 determines a route from the position of the vehicle 200 positioned by the GNSS receiver 234 to a destination designated using the HMI 232 with reference to the navigation map. The navigation control device 236 may transmit the destination and the position of the vehicle 200 to a navigation server (not shown) using the communication device 220 and acquire a route returned by the navigation server. In the case of the embodiment, the route to the destination is designated by the ridesharing management device 300 in some cases. The route may include information regarding a stopping place and a target time of arrival to allow a user to get into or get out of the vehicle. The navigation control device 236 outputs the information regarding a route determined in accordance with any of the foregoing methods to the recommended lane determination device 240.

The recommended lane determination device 240 includes, for example, a map positioning unit (MPU) and various storage devices. A storage device stores highly accurate map information that is more detailed than that of the navigation map. The highly accurate map information includes, for example, information such as road widths, gradients, curvatures of respective lanes, and traffic signal positions. The recommended lane determination device 240 determines a preferred recommended lane to travel along a route input from the navigation device 230 and outputs the recommended lane to the automated driving controller 250.

The automated driving controller 250 includes one or more processors such as a CPU or a micro processing unit (MPU) and various storage devices. The automated driving controller 250 causes the vehicle 200 to automatically drive so that the vehicle 200 avoids contact with objects of which positions or speeds are input from the external monitor unit 210 on the principle that the vehicle 200 travels along a recommended lane determined by the recommended lane determination device 240. The automated driving controller 250 performs, for example, various events in sequence. Examples of the events include a constant speed traveling event for traveling at a constant speed in the same travel lane, a following traveling event for following a front traveling vehicle, a lane changing event, a joining event, a branching event, an emergency stopping event, a toll gate event for passing through a toll gate, and a handover event for ending automated driving and switching to non-automated driving. An action for avoidance is planned according to a surrounding situation (presence of a surrounding vehicle or pedestrian, contraction of a lane due to road construction, or the like) of the vehicle 200 while such an event is being performed in some cases.

The automated driving controller 250 generates a target trajectory along which the vehicle 200 travels in future. The target trajectory includes, for example, speed components. For example, the target trajectory is expressed by arranging places (trajectory points) at which the own vehicle M will arrive in sequence. The trajectory point is a place at which the own vehicle 200 will arrive for each predetermined traveling distance. Apart from the trajectory points, target acceleration and a target speed are generated as parts of the target trajectory for each of predetermined sampling times (for example, about every several tenths of a second [sec]). The trajectory point may be a position at which the own vehicle 200 will arrive at the sampling time for each predetermined sampling time. In this case, information regarding the target acceleration or the target speed is expressed at an interval between the trajectory points.

Figure 3:
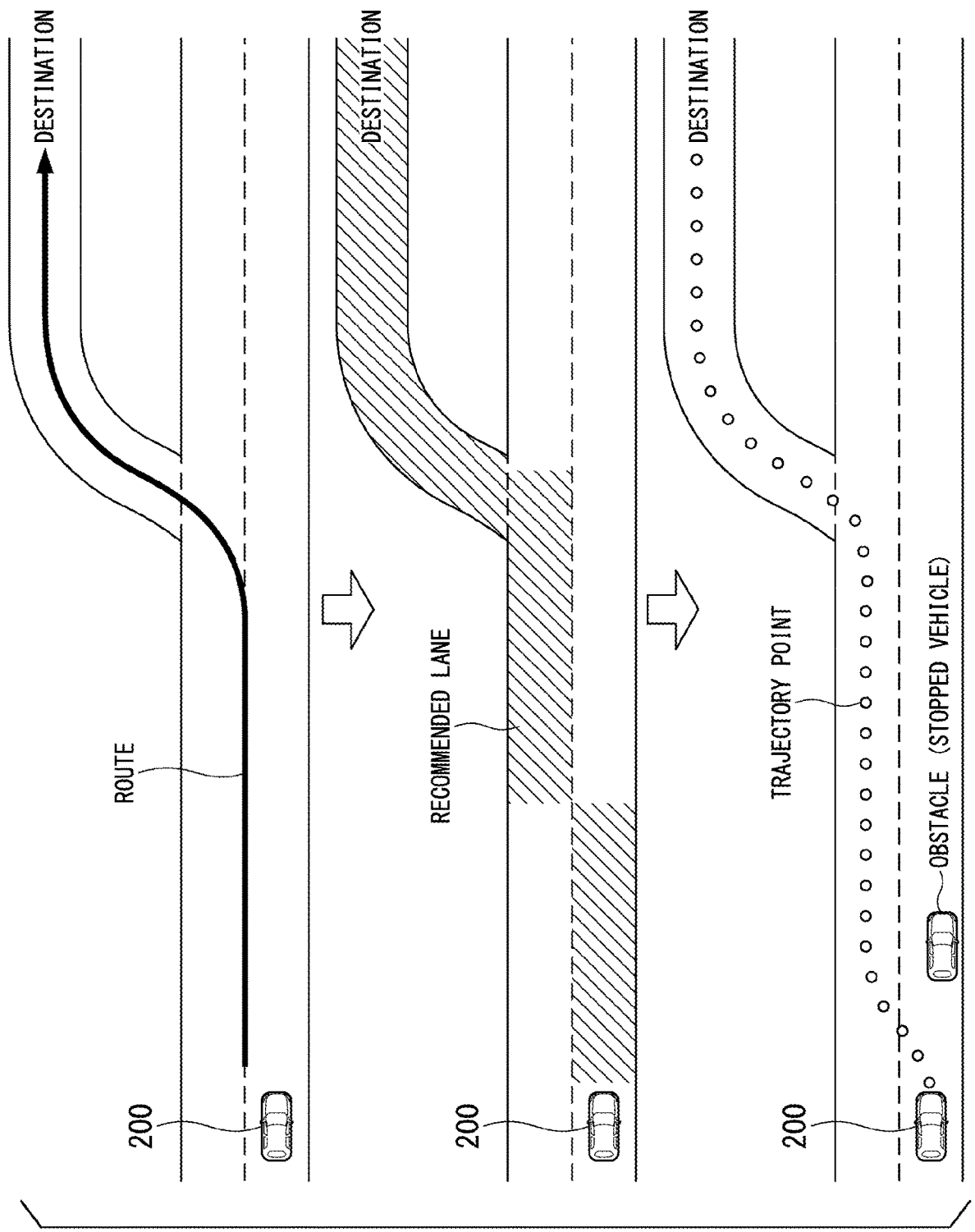
FIG. 3 is a diagram showing a procedure of an automated driving process.

FIG. 3 is a diagram showing a procedure of an automated driving process. First, as shown in the upper drawing, the navigation device 230 determines a route. This route is, for example, a rough route in which lanes are not distinguished. Subsequently, as shown in the middle drawing, the recommended lane determination device 240 determines a recommended lane in which the vehicle easily travels along a route. As shown in the lower drawing, the automated driving controller 250 generates trajectory points for traveling along the recommended lane if possible, for example, while avoiding obstacles and controls some or all of the driving force output device 260, the brake device 262, the steering device 264 such that the vehicle travels along the trajectory points (and a subordinate speed profile). The role sharing is merely exemplary and, for example, the automated driving controller 250 may perform processes unitarily.

The driving force output device 260 outputs a travel driving force (torque) for causing the vehicle to travel to a driving wheel. The driving force output device 260 includes, for example, a combination of an internal combustion engine, an electric motor and a transmission, and a power ECU controlling these units. The power ECU controls the foregoing configuration in accordance with information input from the automated driving controller 250 or information input from a driving operator (not shown).

The brake device 262 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the automated driving controller 250 or information input from the driving operator such that a brake torque in accordance with a brake operation is output to each wheel. The brake device 262 may include a mechanism that transmits a hydraulic pressure generated in response to an operation of the brake pedal included in the driving operator to the cylinder via a master cylinder as a backup. The brake device 262 is not limited to the above-described configuration and may be an electronic control type hydraulic brake device that controls an actuator in accordance with information input from the automated driving controller 250 such that a hydraulic pressure of the master cylinder is transmitted to the cylinder.

The steering device 264 includes, for example, a steering ECU and an electric motor. For example, the electric motor may change the direction of the steered wheels by applying a force to a rack and pinion mechanism. The steering ECU drives the electric motor to change the direction of the steering wheel in accordance with information input from the automated driving controller 250 or information input from the driving operator.

Referring back to FIG. 1, the ridesharing management device 300 includes, for example, a communicator 310, an acquirer 320, a service manager 330, and a storage 380.

The communicator 310 is, for example, a network card connected to the network NW. The storage 380 is realized by a hard disk drive (HDD), a flash memory, a random access memory (RAM), a read-only memory (ROM), or the like. The communicator 310 communicates with the terminal device 100 or the vehicle 200 via the network NW.

The acquirer 320 and the service manager 330 are realized, for example, when a processor such as a CPU executes a program (software) stored in the storage 380. Some or all of the functional units may be realized by hardware such as a large scale integration (LSI), an application specific integrated circuit (ASIC), or a field-programmable gate array (FPGA), or a graphics processing unit (GPU) or may be realized by software and hardware in cooperation.

The acquirer 320 acquires vehicle information transmitted by the vehicle 200 via the communicator 310 and the network NW. The vehicle information includes, for example, a vehicle ID, positional information of the vehicle 200, and information regarding an occupant getting into the vehicle 200 (or carried luggage). The acquirer 320 acquires a boarding request output from the terminal device 100 via the communicator 310 and the network NW and registers a boarding condition included in the boarding request as boarding condition information 384 in the storage 380.

FIG. 4 is a diagram showing an example of content of the boarding condition information 384. As shown, the boarding condition information 384 is information in which a desired boarding place, a destination, a desired boarding time, positional information of a user, a movement method when the user heads for the desired boarding place (information for specifying a train, a bus, a route, or the like), an allocate flag indicating whether allocate is determined (for example, 1 indicates that allocate is determined and 0 indicates that allocate is not determined), and the like are associated with a user ID which is identification information of a user registered in advance. Content of information other than the allocate flag is determined by allowing the ridesharing application of the terminal device 100 to receive an input of a user and is transmitted as a boarding request to the ridesharing management device 300. The desired boarding place may be any place or may be a preset pick-up place included in map information 386 to be described below. Hereinafter, a series of information associated with one user ID in the boarding condition information 384 is referred to as a record in some cases.

The service manager 330 searches for the available vehicle 200 with reference to the boarding condition information 384, the map information 386, and the service schedule information 388. The map information 386 includes facility information indicating an overview of various facilities in addition to information regarding nodes or links (a navigation map or a high-precise map of the vehicle 200 may include such information). FIG. 5 is a diagram showing an example of content of pick-up place information included in the map information 386. The pick-up place information is, for example, information in which a position, content of a pick-up place, and the like are associated with a pick-up place ID which is identification information of the pick-up place. The content of the pick-up place is information indicating where the pick-up place is located. For example, information indicating a rotary in front of a station, a convenience store, or a restaurant is associated with the content of the pick-up place.

For example, the service manager 330 roughly groups records in which periods of time and travel sections from a desired boarding place to a destination are close among records included in the boarding condition information 384, extracts one or more records according to a grouped result, and registers the records as part of service schedule information 388 in the storage 380.

FIG. 6 is a diagram showing an example of content of the service schedule information 388. As shown, the service schedule information 388 is information in which coordinates of a departure place, a transit place, and an arrival place, a user ID of a user getting into a vehicle at each transit place, and a user ID of a user getting out of are associated with a vehicle ID which is identification information of the vehicle 200 managed by the ridesharing management device 300. The departure place or the arrival place is normally a garage or the like. Information regarding a "vacant vehicle" of which a service schedule has not yet been determined is also registered in the service schedule information 388. In this case, for a vacant vehicle, only coordinates of a departure place is registered. The service manager 330 may collect boarding requests from a plurality of users and determine a service schedule of one vehicle 200, as described above, or may search for a service schedule determined in advance and change the service schedule so that boarding requests of other users are included. That is, when the service manager 330 searches for the available vehicle 200, the service manager 330 may search for the vehicle 200 of which the boarding schedule is not yet determined or may search for a boarding schedule of the already determined vehicle 200 which can include a boarding request of a user. The transit place is a pick-up place or a position at which an occupant gets out of the vehicle 200. At a predetermined timing, the service manager 330 transmits information regarding a route (transit place) according to the service schedule information 388 and an estimated passage time to the vehicle 200.

The service manager 330 includes, for example, a grouper 332, a cost deriver 334, a pick-up place determiner 336, a vehicle specifier 338, and a corrector 340. The grouper 332 performs a grouping process of grouping users associated with similar boarding conditions according to a boarding condition included in the boarding request. The similar boarding conditions are, for example, a predetermined range of a desired boarding place included in the boarding condition and a desired boarding time is within a predetermined time.

The cost deriver 334 derives indexes indicating a cost incurred for the grouped users to arrive at candidate places and determines a candidate place with the index indicating a lower cost than the other candidate places as a pick-up place. The pick-up place determiner 336 determines the pick-up place at which the allocated vehicle 200 is picked up to assemble the grouped users according to results of the grouping process and the allocating process performed by the vehicle specifier 338. The vehicle specifier 338 performs an allocating process of allocating the vehicle 200 into which the grouped users can get. The corrector 340 changes the pick-up place according to positional information of the users and positional information of the allocated vehicle 200.

Figure 7:
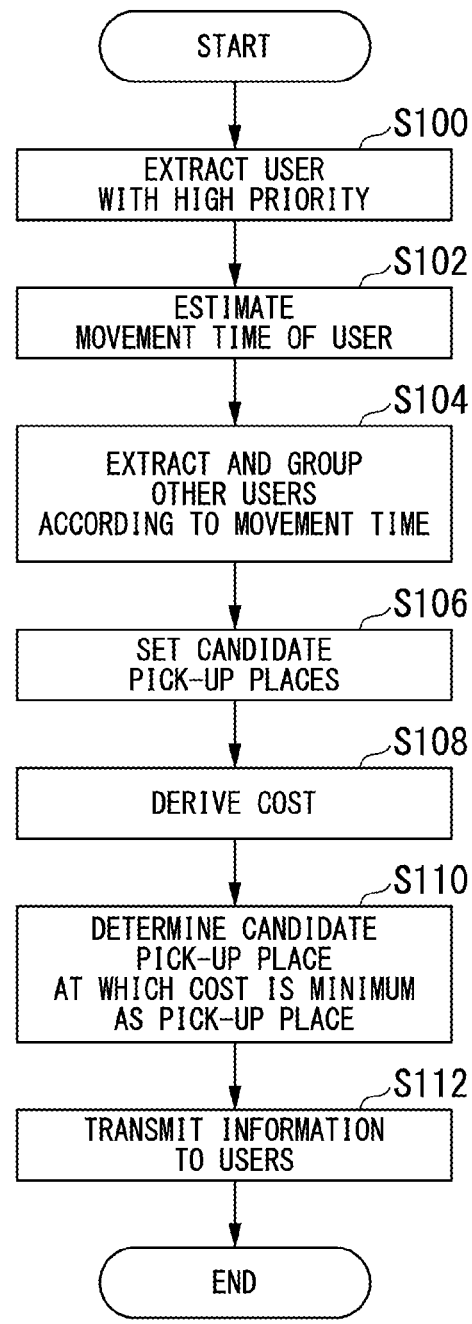
FIG. 7 is a flowchart showing a flow of a pick-up place determination process performed by the ridesharing management device 300.

FIG. 7 is a flowchart showing a flow of a pick-up place determination process performed by the ridesharing management device 300. A mode in which a pick-up place is determined through the process will be described specifically in FIG. 8 to be described below.

First, the grouper 332 extracts a boarding request of a user with high priority (priority user) among the boarding requests (step S100). A user with high priority is, for example, a predetermined user, a user who has transmitted a boarding request earlier than other users among preset users to whom a vehicle 200 has not yet been allocated, or the like.

Subsequently, the grouper 332 estimates a movement time necessary for a user to arrive at a desired boarding place according to positional information of the user included in a preference boarding request, a desired boarding place, and a movement method (a train, a bus, on foot, or the like) (step S102). The movement method may be acquired according to information input by the user operating the terminal device 100 or may be derived according to a position and a movement speed of the user. For example, when the user is moving at a predetermined speed or more on a railway or a bus route with reference to the map information 386, the service manager 330 determines that the user is moving on a train or a bus. In estimation of a movement time, traffic organization diagram information 390 may be referred to.

Subsequently, the grouper 332 extracts users who can move to the vicinity of a desired boarding place at a time close to a time at which the priority user arrives near the desired boarding place and of which traveling sections from the desired boarding place to a destination are close to a traveling section of the priority user among the users having transmitted the boarding requests and groups the extracted users (step S104).

Subsequently, the cost deriver 334 set candidate pick-up places for the grouped users (step S106). The candidate pick-up places are, for example, pick-up places which are within a predetermined distance from the desired boarding place of the priority user which is a standard.

Subsequently, the cost deriver 334 derives a cost of a combination of a candidate pick-up place and a current position of each user included in the group (step S108). For example, the cost is calculated according to an expense or a movement time at the time of movement of the user from a current place of the user to the candidate pick-up place and a distance from the current place to the candidate pick-up place. The expense is an expense when a train or a bus is used in the movement. For example, a higher cost is calculated when the expense is higher, the time is longer, or the distance is longer. More specifically, the cost is calculated by Expression (1). In Expression (1), a cost of a predetermined candidate pick-up place pn is a sum value of costs ($Cu_1$ to $Cu_n$) of the users.

$$Cpn = Cu_1 + Cu_2 + Cu_3 + \ldots + Cu_n \quad (1)$$

When user information 382 includes preference information indicating preference of a user, a cost may be calculated according to the preference information. The preference information is, for example, information indicating a limit of a movement time or a limit or the like of an expense. For example, focusing on a predetermined candidate pick-up point and a predetermined user, if the cost exceeds a limit included in a user's preference information, weighting according to the degree of exceeding the limit for the cost of the user may be performed, and the user may be excluded from a group. An index indicating ease of assembly is associated with each pick-up place and the index may be added to the cost (for example, an index value is subtracted from the cost). For example, a pick-up place at which assembly is easy may be associated with a higher index value than that for a pick-up at which the assembly is difficult.

Subsequently, the pick-up place determiner 336 determines a candidate pick-up place at which the derived cost is a minimum (step S110). Then, the pick-up place determiner 336 transmits information indicating the determined pick-up place to the terminal device 100 of the users (step S112). Thus, the process of the flowchart ends. Through the above-described process, a place at which the movement cost of the user is the minimum can be set as a pick-up place.

Figure 8:
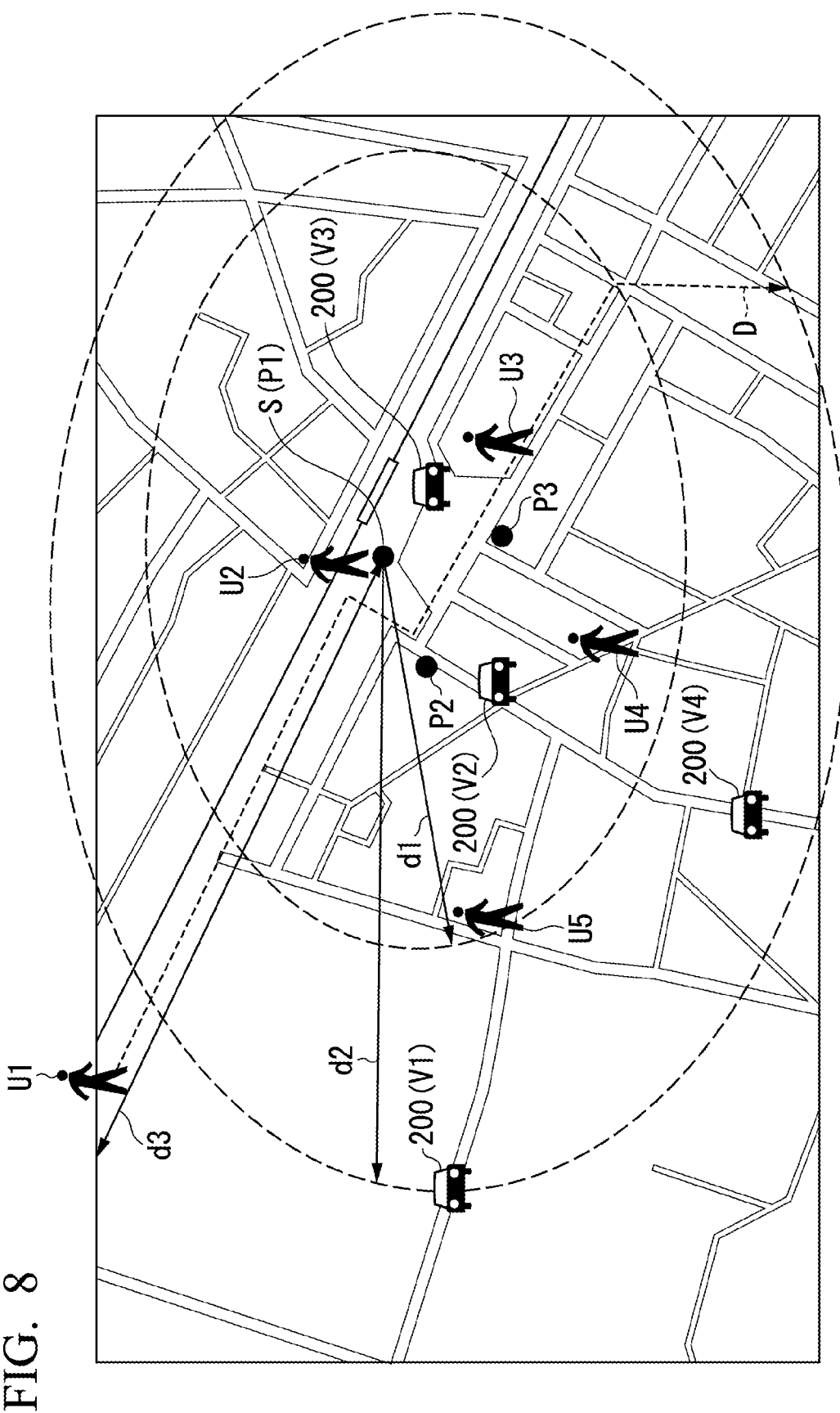
FIG. 8 is a diagram showing a mode in which a pick-up place is determined.

FIG. 8 is a diagram showing a mode in which a pick-up place is determined. For example, users U1 to U5 are assumed to set station S or the vicinity of station S as a desired boarding place and transmit boarding requests to the ridesharing management device 300. Destinations of the users U1 to U5 are in a D direction in the drawing and the user U1 is assumed to be set as a priority user. The user U1 is assumed to board on a train and move from a station near station S.

In this case, for movement time T estimated when the user U1 arrives at station S, the users U2 to U4 who can move to station S are extracted and the users U1 to U5 are grouped. The users U2 to U5 are, for example, users who are within a distance d1 at which the users can move on foot during movement time T. In the example shown in the drawing, for movement time T, a distance at which a user can move using the vehicle 200 is d2 and a distance at which a user can move using a train is d3.

When the users U1 to U5 are grouped, a cost is calculated at each of candidate pick-up places P1 to P3 and the candidate pick-up place P1 with the minimum cost is determined as a pick-up place. Then, the users U1 to U5 can recognize the pick-up place P1 via the terminal device 100.

Figure 9:
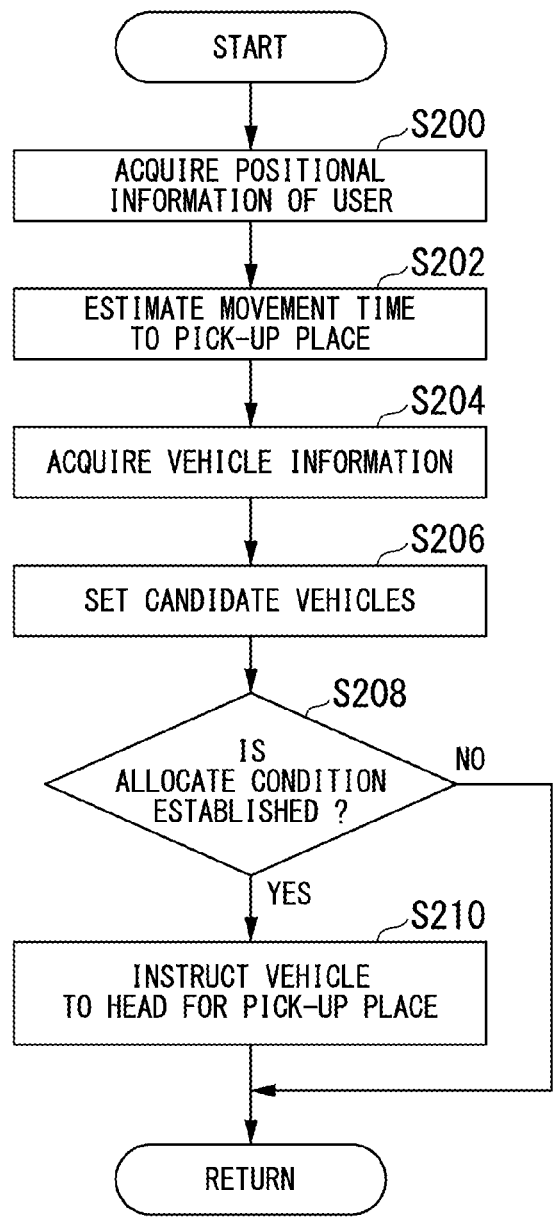
FIG. 9 is a flowchart showing a flow of a determination process of the picked-up vehicle 200 performed by the ridesharing management device 300.

FIG. 9 is a flowchart showing a flow of a determination process of the picked-up vehicle 200 performed by the ridesharing management device 300. A mode in which the vehicle 200 is determined through this process will be described specifically in FIG. 10 to be described below.

First, the acquirer 320 acquires positional information from the terminal device 100 of the user (step S200). Subsequently, the service manager 330 estimates a movement time from the current place of the user to the pick-up place for each user according to the positional information of the user and the pick-up place (step S202). For example, the service manager 330 estimates a movement time by calculating a movement speed of the user from previous position information of the user and current positional information of the user or adding a movement method of the user.

Subsequently, the acquirer 320 acquires vehicle information from the vehicle 200 (step S204). Subsequently, the vehicle specifier 338 set candidate vehicles according to the acquired positional information of the user and the acquired vehicle information (step S206). The candidate vehicles are vehicles which can arrive at the pick-up place at a time at which the grouped users are assumed to assemble at the pick-up place and are vehicles into which the grouped users can get.

Subsequently, the vehicle specifier 338 determines whether the allocate condition is established (step S208). The case in which allocate condition has been established is, for example, a case in which a predetermined time at which all of grouped users or a predetermined user (for example, a priority user) have been determined to arrive at a pick-up place is reached. The predetermined time is a time determined according to a time necessary for the allocated vehicle 200 to move to the pick-up place and is, for example, a movement time of the vehicle 200 moving to the pick-up place or a time obtained by adding a time to spare to the movement time.

The case in which the allocate condition is established may be, for example, a case in which the user arrives at a position a predetermined distance away from the pick-up place. Getting out of a train, a bus, or the like may be regarded as a part of the allocate condition.

When the allocate condition is not established, the process of one route of the flowchart ends. When the allocate condition is established, the vehicle specifier 228 transmits an instruction to head for the pick-up place to the vehicle 200 (step S210). In this way, the process of one routine of the flowchart ends. The instruction to head for the pick-up place to the vehicle 200 is an example of "information according to a variation in the positional information of the user." Instead of the foregoing instruction, the ridesharing management device 300 may transmit the positional information of the user scheduled to get into the vehicle 200 to the vehicle 200. In this case, the vehicle 200 determines whether the allocate condition is established and starts toward the pick-up place when the allocate condition is established.

When the allocate condition is established, the candidate vehicles can be allowed to head for the pick-up place through the above-described process. Therefore, it is possible to curb a movement cost of the vehicle 200. It is possible to curb a waiting time of the vehicle 200 at the pick-up place. For example, the process is suitable when a place at which it is difficult to stand by for a long time is a pick-up place.

Figure 10:
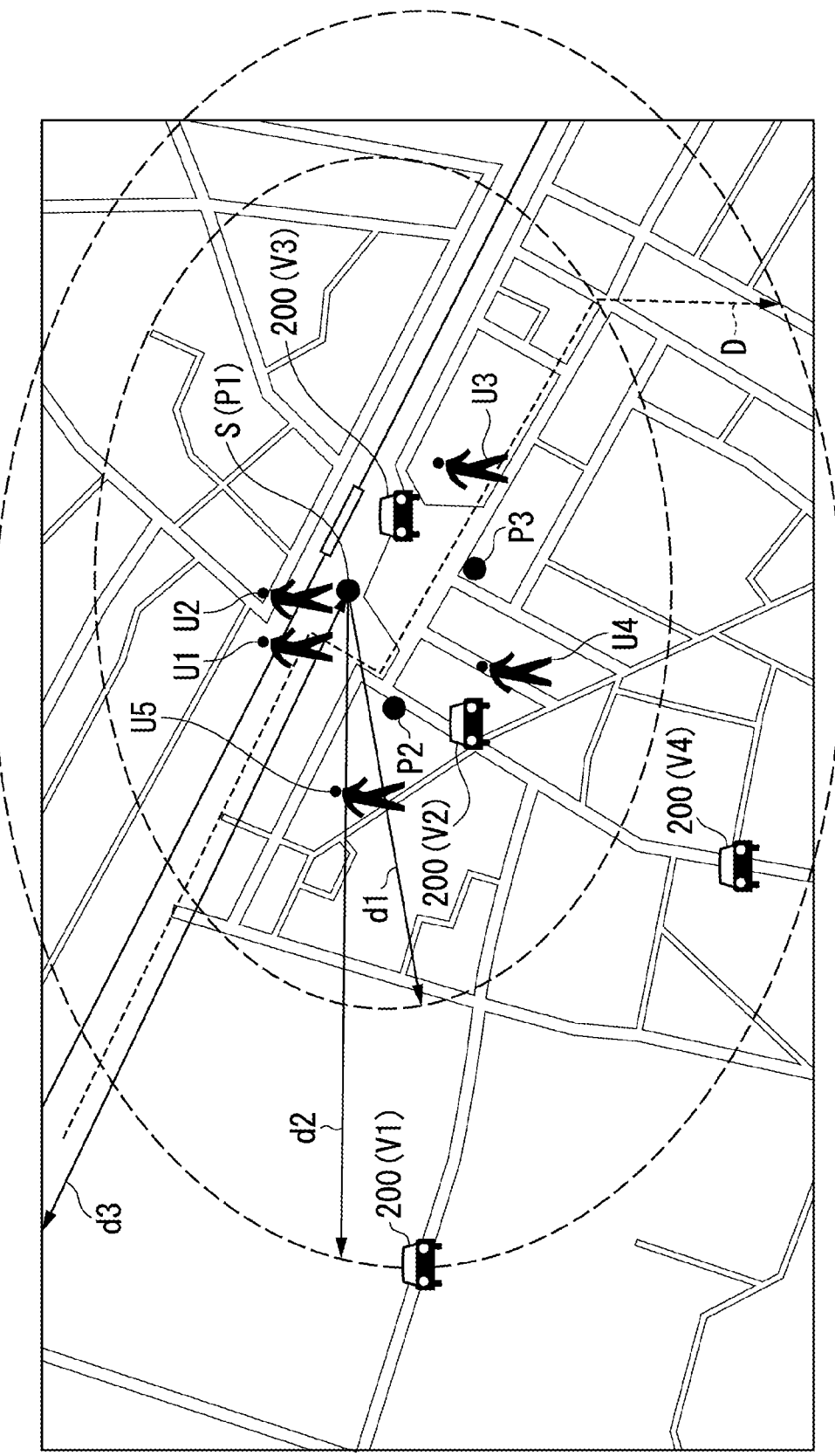
FIG. 10 is a diagram showing a mode in which the vehicle 200 is allocated.

FIG. 10 is a diagram showing a mode in which the vehicle 200 is allocated. For example, the vehicle 200 (V2) which is near the pick-up place P1 and into which the users U1 to U5 can get is assumed to be set as a candidate vehicle. When the allocate condition is established, the vehicle 200 (V2) starts to move to the pick-up place P1 in accordance with an instruction from the ridesharing management device 300. The case in which the allocate condition is established in the example of FIG. 10 is, for example, a case in which a time at which it is assumed that the user U1 gets out of a train and arrives at the pick-up place P1 reaches a predetermined time.

Figure 11:
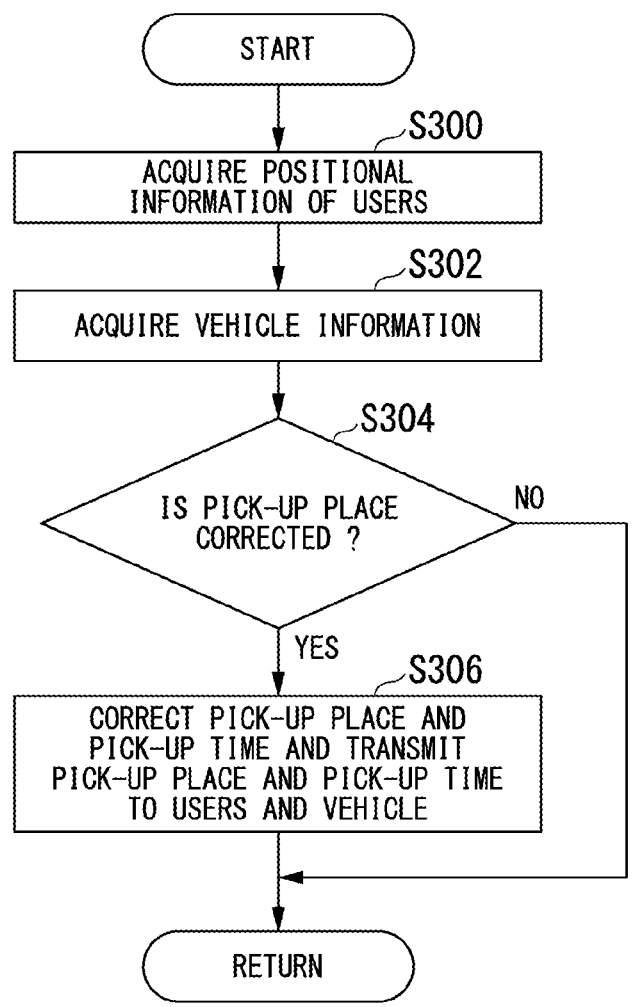
FIG. 11 is a flowchart showing a flow of a pick-up place correction process performed by the ridesharing management device 300.

FIG. 11 is a flowchart showing a flow of a pick-up place correction process performed by the ridesharing management device 300. A mode in which the pick-up place is corrected through the process will be described specifically in FIG. 12 to be described below.

First, the acquirer 320 acquires the positional information from the terminal device 100 of the user (step S300). Subsequently, the acquirer 320 acquires the vehicle information from the vehicle 200 (step S302). Subsequently, the corrector 340 determines whether to correct the pick-up place according to the acquired positional information of the user and the acquired vehicle information (step S304). A case in which the pick-up place is corrected is, for example, a case in which it is more efficient for the user to depart for a destination than to assemble at the determined pick-up place. For example, the case in which the pick-up place is corrected is a case in which the user can assemble more quickly when the pick-up place is corrected than before the pick-up place is corrected or a case in which the vehicle 200 can arrive quickly at the pick-up place avoiding congestion or the like.

When the pick-up place is not corrected, the process of one routine of the flowchart ends. When the pick-up place is corrected, the corrector 340 corrects the pick-up place according to the positions of the users U1 to U5 and the position of the vehicle 200 (step S306). The pick-up place is, for example, a place at which the users U1 to U5 can get into the vehicle 200 quickly. The corrector 340 corrects the pick-up time, for example, according to a distance from the pick-up place before the correction to the pick-up place after the correction, the positions of the users, the position of the vehicle 200, or the like. Then, the ridesharing management device 300 transmits the corrected pick-up place and pick-up time to the terminal devices 100 of the user and the vehicle 200. In this way, the process of one routine of the flowchart ends.

Through the above-described process, the pick-up place is corrected according to the positions of the users U1 to U5 or the position of the vehicle 200. Therefore, the more appropriate pick-up place is set for the users or the vehicle 200.

Figure 12:
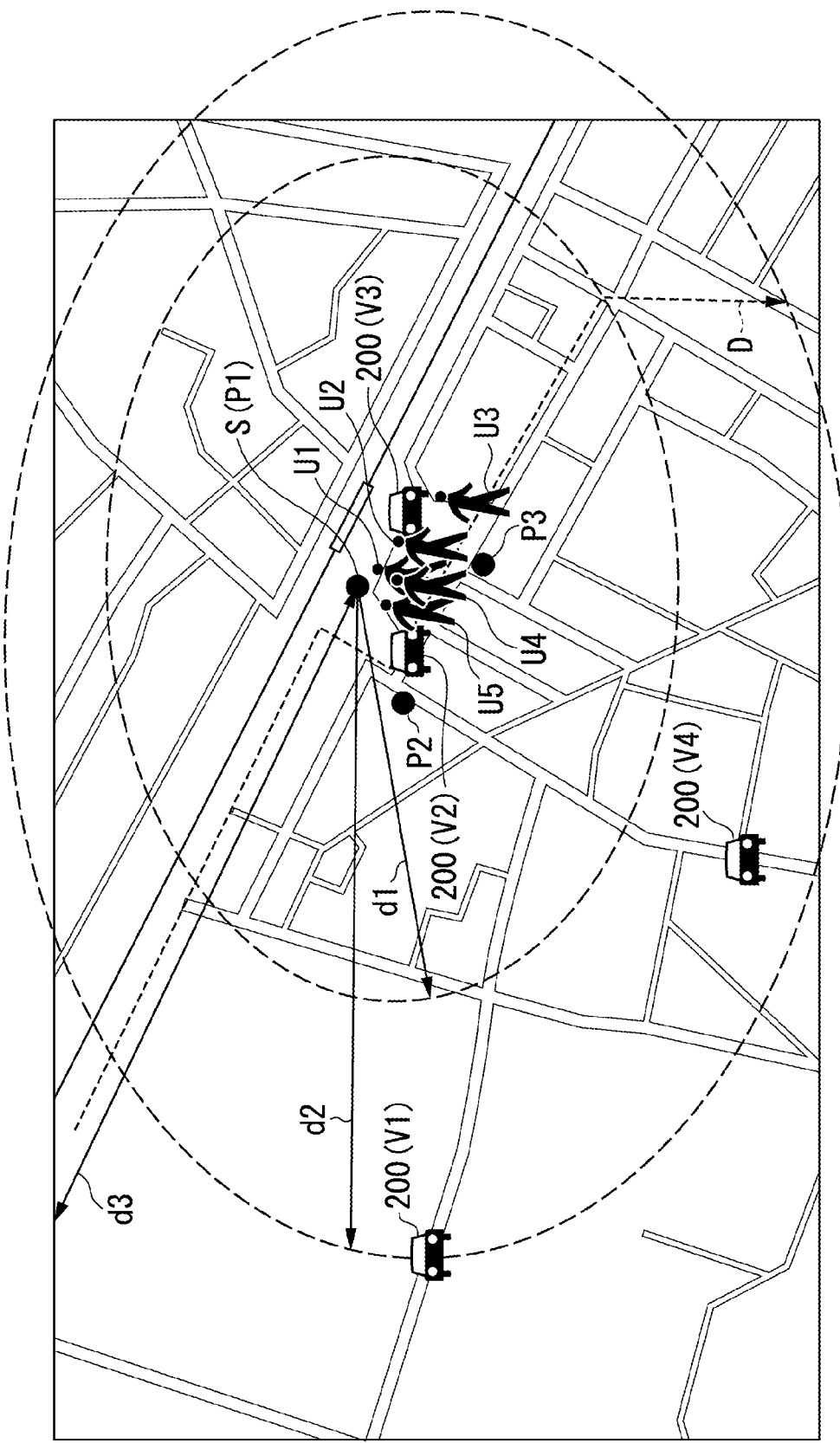
FIG. 12 is a diagram showing a mode in which a pick-up place is corrected.

FIG. 12 is a diagram showing a mode in which a pick-up place is corrected. For example, it is assumed that the users other than the user U3 assemble at first set the pick-up place P1, but the user U3 is at a place away from the pick-up place P1. In this case, the corrector 340 sets the pick-up place P3 which is an intermediate place between the pick-up place P1 and the place at which there is the user U3 as a new pick-up. By correcting the pick-up place in this way, the user can assemble at the pick-up place quickly.

Figure 13:
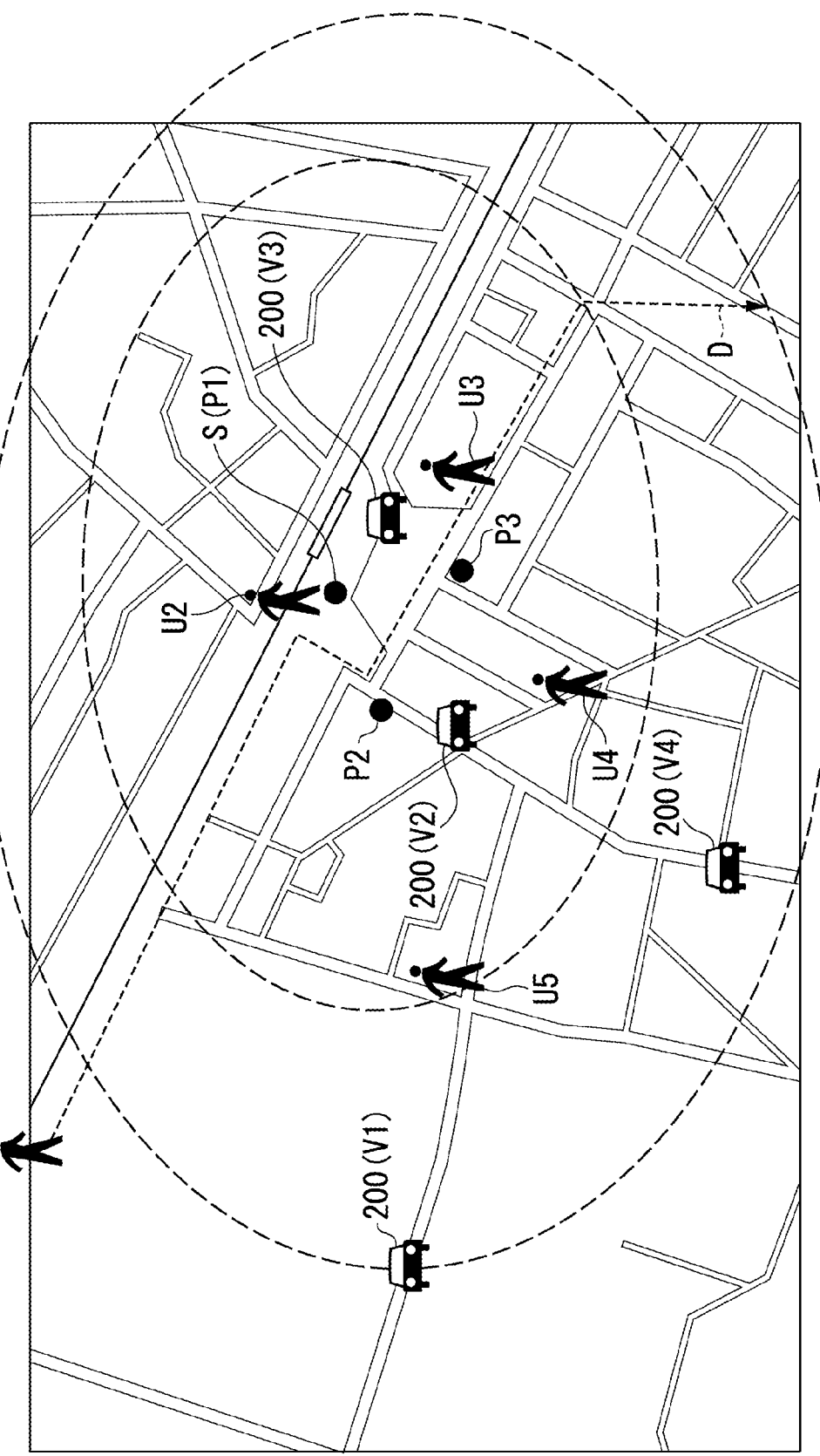
FIG. 13 is a diagram showing another mode in which a pick-up place is determined.

FIG. 13 is a diagram showing another mode in which a pick-up place is determined. For example, a case in which the vehicle 200 is allocated so that the user U2 at station S can head for a destination will be described. In this case, the grouper 332 determines whether there is a user who is at a place near the user U2 (a place for joining with the user U2 in several minutes to several tens of minutes) among the users who have transmitted the boarding requests. When there is the user who is near the user U2, the grouper 332 groups the user U2 and the user who is near the user U2. In the shown example, it is assumed that there is no user associated with the place near the user U2.

Subsequently, the vehicle specifier 338 specifies the vehicle 200 (V2) into which the user U2 gets according to the vehicle information acquired by the acquirer 320. The vehicle 200 (V2) into which the user U2 gets is a vehicle which can head for the destination of the user U2 and into which the user U2 can get and is the vehicle 200 with a low cost spent to pick up the user U2. The low cost means that a time necessary to arrive near the user U2 is short or a distance from the place at which there is the user U2 is short. The low cost means that the user U2 can move on foot without using a train, a bus, or the like.

Subsequently, the pick-up place determiner 336 determines the pick-up place P2 at which a movement cost (movement times, movement distances, or movement methods) of the vehicle 200 and the user U2 is small according to the positional information of the vehicle 200 specified by the vehicle specifier 338 and the positional information of the user U2 and transmits the determined pick-up place P2 to the terminal device 100 of the user U2 and the vehicle 200. At this time, the ridesharing management device 300 may transmit information indicating a route from the current place of the user U2 to the determined pick-up place P2 to the terminal device 100 of the user U2.

When the ridesharing management device 300 allows the user to move using a public transportation organization or the like and head for the pick-up place since the pick-up place is distant from the position of the user U2 by a predetermined distance or more unlike the shown example, information indicating a route from the current position of the user U2 to the determined pick-up place may be transmitted to the terminal device 100 of the user U2.

When the vehicle 200 heading for the destination of the user U2 is not near the user U2, the user U2 may be allowed to transfer the plurality of vehicles 200 and may be taken to the destination. In this case, the ridesharing management device 300 may allocate the vehicle 200 taking the user U2 to the destination and allocate the vehicle 200 taking the user U2 to the pick-up place.

For example, when a time equal to or greater than a predetermined time is estimated to be necessary in order for the vehicle 200 used by the user U2 to go and meet a user in the above-described process, the pick-up place determiner 336 may correct the pick-up place. For example, the pick-up place determiner 336 changes the pick-up place to the pick-up place P1. The pick-up place P1 is a place at which there is a high possibility of presence of the vehicle 200 which is the vehicle 200 different from the allocated vehicle and into which a user can freely get.

The user U2 may set to permit grouping or non-grouping by operating the terminal device 100. In the case of the setting in which the grouping is not permitted, the vehicle specifier 338 allocates the vehicle 200 occupied by the user U2 to the user U2.

For example, when the vehicle 200 (V2) may not stop since the user U2 and the allocated vehicle 200 (V2) pass by one another at the pick-up place P2 or another vehicle is stopping at the pick-up place P2, the pick-up place may be changed. For example, the pick-up place determiner 336 recognizes that the user U2 may not get into the vehicle 200 (V2) at the pick-up place P2 according to a change in the positional information of the user U2 and the vehicle 200 (V2). In this case, for example, the pick-up place determiner 336 corrects the pick-up place to the pick-up place P1 (for example, station S) at which the vehicle 200 (V2) and the user U2 assemble easily.

When the service manager 330 detects that a user without a reservation desires to use the allocated vehicle 200, the service manager 330 may prepare another vehicle 200 different from the allocated vehicle 200 to correspond to the desire to use the allocated vehicle 200 by the user without a reservation. The user without a reservation is a user who is not included in a service schedule of the allocated vehicle 200. For example, an authentication device is provided in the vehicle 200. The authentication device reads a code printed on a medium or a code drawn on an image displayed on a display of the terminal device 100, decodes read information, and acquires electronic information. Then, the authentication device transmits information read by a reading unit to the ridesharing management device 300. The information encoded in the code is, for example, a user ID. The authentication device may acquire a user ID stored in a storage of an IC card or the like by performing wireless communication with the IC card or the like held by the user. When the received user ID is a user ID of the user without a reservation, the ridesharing management device 300 inserts the user ID of the user without a reservation to the service schedule and transmits information indicating that a boarding of the user without a reservation is permitted to the vehicle 200. Thus, the user without a reservation can get into the vehicle 200 which is near without reservation. When the user without a reservation is allowed to get into the vehicle 200 and the user inserted into the service schedule through advanced reservation may not get into the vehicle 200, the ridesharing management device 300 allocates another vehicle 200 to the user who has not gotten into the vehicle 200. As a result, it is possible to improve convenience for the user who has not made a reservation without deterioration in the convenience for the user who has made the reservation.

In the foregoing example, when the authentication device of the vehicle 200 acquires the user ID of a non-user, the non-user may be allowed to get into the vehicle 200. In this case, when the non-user is allowed to get into the vehicle 200 and the reserved user may not get into the vehicle 200, the vehicle 200 may request the ridesharing management device 300 to allocate another vehicle 200.

As described above, the ridesharing management device 300 groups the users and allocates the vehicle 200 setting a place at which the grouped users can efficiently assemble as the pick-up place, and thus the plurality of users can gather and ride together efficiently.

Second Embodiment

Hereinafter, a second embodiment will be described. In a ridesharing system 1A according to the second embodiment, the vehicle 200 delivers luggage or the like to a destination in response to a request of a user in addition to delivery of the user to the destination. A ridesharing management device 300A orders provision of a service in response to a use request to a service provider. Hereinafter, differences from the first embodiment will be mainly described.

Figure 14:
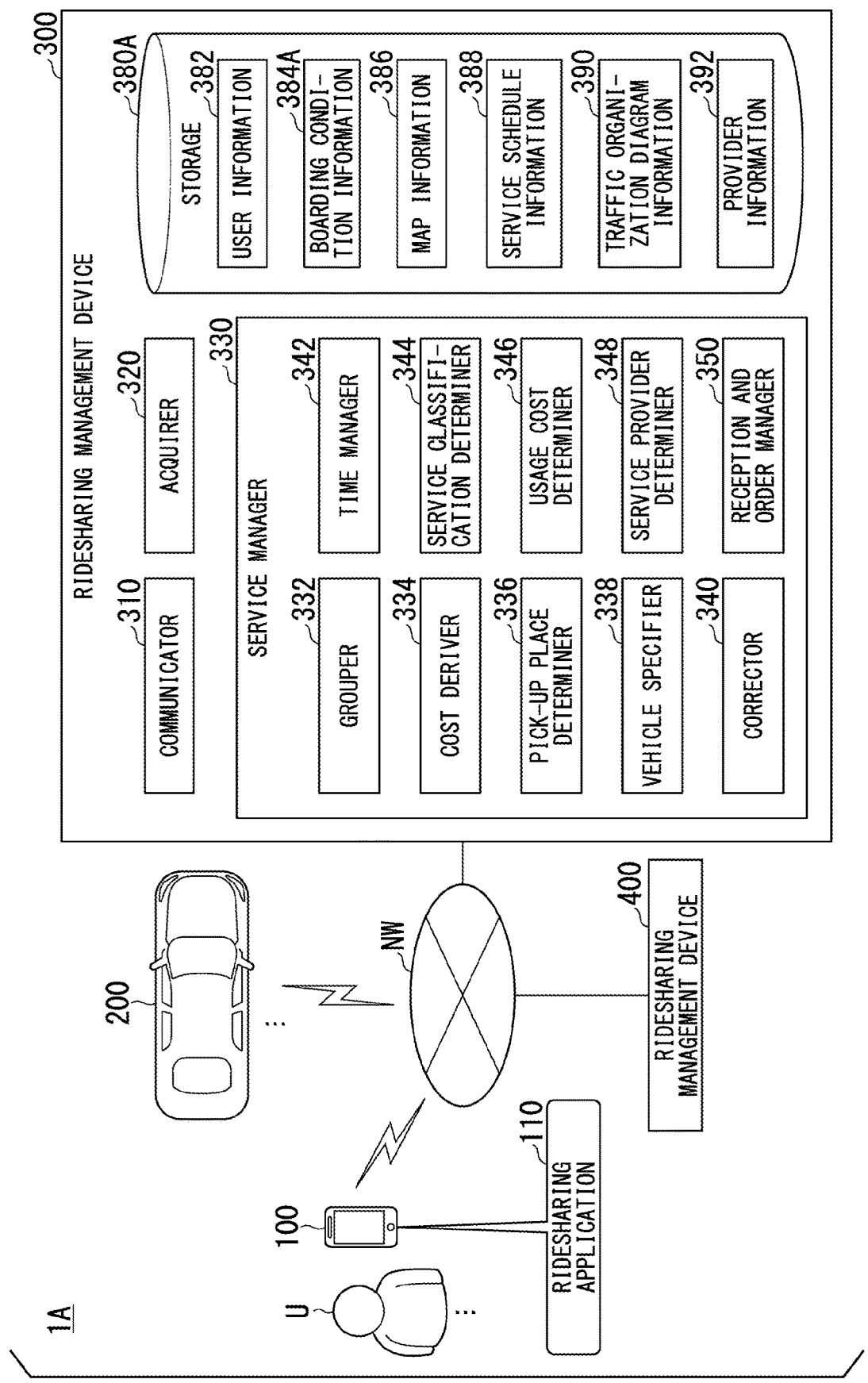
FIG. 14 is a diagram showing a configuration of a ridesharing system 1A including a ridesharing management device 300A according to a second embodiment.

FIG. 14 is a diagram showing a configuration of the ridesharing system 1A including the ridesharing management device 300A according to the second embodiment. The ridesharing system 1A includes, for example, the ridesharing management device 300A instead of (in addition to) the ridesharing management device 300. The ridesharing system 1A further includes a ridesharing management device 400. For example, a functional configuration of the ridesharing management device 400 is similar to the functional configuration of the ridesharing management device 300A to be described below. Hereinafter, the ridesharing management device 400 is referred to as a "service provider" in some cases. A supervisor of the ridesharing management device 400 may be a supervisor (the same or affiliated company) similar to a supervisor of the ridesharing management device 300A or may be a different manager (for example, a different company).

The ridesharing management device 300A includes a service manager 330A instead of the service manager 330. The service manager 330A further includes a time manager 342, a service classification determiner 344, a usage cost determiner 346, a service provider determiner 348, and a reception and order manager 350 in addition to the functional configuration of the service manager 330.

The time manager 342 manages times treated in a process of the ridesharing management device 300A. For example, the time manager 342 estimates a time necessary for the user or the vehicle 200 to move in a predetermined section using information retained by the ridesharing management device 300A or information acquired from another device.

The service classification determiner 344 determines a service classification according to a pick-up request. The usage cost determiner 346 determines the usage cost of a service provided to the user according to a desired pick-up place, a destination, and a service classification. The usage cost determiner 346 corrects the usage cost according to desired order reception information presented by a service provider in accordance with order information. The order information is information which is transmitted to the service provider by the ridesharing management device 300A and is used to request an order of provision of a service for a user.

The service provider determiner 348 determines a service provider that is configured to provide a service to a user according to the service classification. The service provider determiner 348 determines a service provider with reference to desired receiving and order reception information presented by the service provider or incentive information related to a destination. The reception and order manager 350 manages the order information for requesting an order of provision of a service to the service provider or presents the order information to the service provider.

A storage 380A according to the second embodiment stores use condition information 384A instead of the boarding condition information 384. FIG. 15 is a diagram showing an example of content of the use condition information 384A. The use condition information 384A is information in which a desired pick-up place, a destination, a desired pick-up time, positional information of a user, a movement method when the user heads for the desired boarding place, an allocate flag indicating whether allocate is determined, and the like are associated with a user ID. Content of information other than the allocate flag is determined by allowing the ridesharing application of the terminal device 100 to receive an input of a user and is transmitted as a use request to the ridesharing management device 300.

The use condition information 384A includes a planned movement distance of a user, the number of use people, a service classification, and a standard fee. The planned movement distance is a distance which is derived according to the desired pick-up place, the destination, and the map information by the service manager 330A. The number of people is, for example, the number of boarding people desired as a use condition by a user. The service classification is a service classification desired as a use condition by a user and is, for example, a classification decided in advance such as transport of luggage, transport of people, transport of animals, use of a specific service, and the like. The specific service is, for example, shopping, haircut, internal medical clinic, or the like. The service is a service which can be received in a specific vehicle capable of providing the service. The use condition information 384A may include a kind of vehicle. A type of vehicle is a vehicle for only boarding, a vehicle for only luggage, a vehicle for passengers and freights, a large-sized vehicle, a small-sized vehicle, a luxury vehicle, or the like.

The standard fee is a fee that is derived by the usage cost determiner 346 according to information included in the use condition information 384A and a standard set in advance. The standard decided in advance is a standard that is set using one or more items among a desired pick-up place, a destination, a desired pick-up time, a planned movement distance, the number of people, a service classification, demand for use, and a movement time or a combination thereof. For example, as a cost for providing a service is higher, demand for use is higher, a planned movement distance is longer, a movement time is longer, or the number of use people is larger, the standard fee tends to be higher than the case contrary thereto.

The storage 380A stores provider information 392 in addition to the information stored in the storage 380. The provider information 392 is information that is acquired from a service provider and is information regarding a cost (an order reception amount to be described below) when a service provider provides a user with a service equal to that of the ridesharing management device 300A. The provider information 392 includes content of services which can be provided by the service provider. The content of a service which can be provided by the service provider is, for example, a service classification or a specific service.

Figure 16:
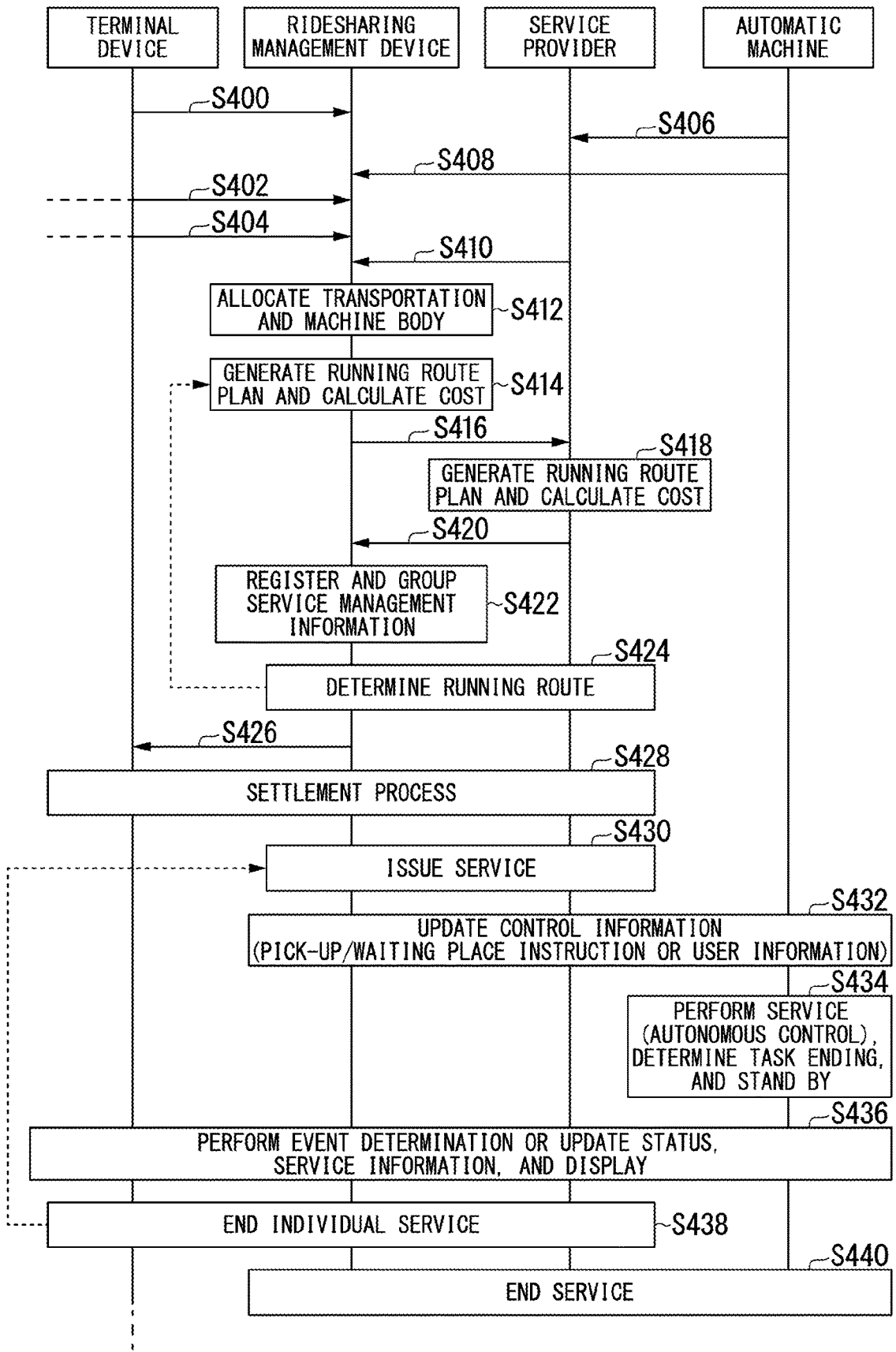
FIG. 16 is a sequence diagram showing a process performed by the ridesharing system 1 according to the second embodiment.

FIG. 16 is a sequence diagram showing a process performed by the ridesharing system 1 according to the second embodiment. Hereinafter, an automatic machine (for example, the vehicle 200) is allocated in response to a use request in the description. However, instead of the vehicle 200, another moving body (for example, a ship that autonomously operates or an airplane that autonomously flies, or the like may be allocated. The ridesharing system 1 may allocate a vehicle, a ship, an airplane, or the like that is manually controlled.

The terminal device 100 transmits a use request to the ridesharing management device 300A (steps S400 to S404). The use requests in steps S400 to S404 are assumed to be transmitted by other terminal devices 100. The vehicle 200 transmits vehicle information to the service provider and the ridesharing management device 300 (steps S406 and S408). Subsequently, the ridesharing management device 300A acquires environmental information from the service provider (or another server device) (step S410). The environmental information is information regarding weather or the like in environment in which vehicles pass or information regarding situations of roads or the like.

Subsequently, the service manager 330A of the ridesharing management device 300A allocates transportation and a kind of vehicle in response to a use request of a user among transportations and kinds of vehicles which can be allocated by the ridesharing system 1A in response to a use request of a priority user (step S412). For example, the service manager 330A allocates transportation so that the user can efficiently arrive at a destination among the available transportations with reference to the acquired environmental information. The fact that the user can efficiently arrive at the destination means that, for example, a required time until the user arrives at the destination is shorter than a required time by another transportation or a rough cost necessary to arrive at the destination is less than a rough cost incurred for another transportation. For example, when the user can arrive at the destination more efficiently by using the vehicle 200 than using another transportation (for example, a ship), the vehicle 200 can be selected as transportation. Further, the kind of vehicle 200 with a less cost (for example, a fee paid by the user or an amount paid by a supervisor of the ridesharing management device 300) can be allocated among the plurality of vehicles 200. The service manager 330A derives a required time or a rough cost according to information regarding a service schedule of each transportation stored in the storage 380A or information regarding a cost from the pick-up place to the destination and a predetermined algorithm.

For example, the service manager 330A selects a kind of vehicle in accordance with the service classification determined by the service classification determiner according to the use request. For example, when the service classification is transport of luggage, the service manager 330A selects the vehicle 200 capable of transporting the luggage.

Subsequently, the service manager 330A generates a running route plan in which a vehicle prepared with the own device is used with reference to the service schedule information 388 and derives a running cost when the generated running route plan is performed (step S414). The running cost when the running route plan is performed is an index indicating a cost derived by statistically processing an index related to a required time predicted when the running route plan derived by the usage cost determiner 346 is performed and an index related to the expense. This index is derived in accordance with an algorithm decided in advance or a statistical scheme.

Subsequently, the service provider determiner 348 determines the service provider capable of providing the service classification of the use request with reference to the provider information 392. The reception and order manager 350 transmits the route information included in the generated running route plan, the use request (for example, the number of use people or the service classification), a desired order amount, and the kind of vehicle to the service provider (step S416). That is, the reception and order manager 350 presents information (order information) regarding an order including a desired order amount to the service provider. For example, the desired order amount is derived according to information in which the index indicating the running cost derived in step S414 and the desired order amount are associated. The desired order amount is an amount of a profit which can be obtained by an organization managing the ridesharing management device 300A. For example, a desired order amount is derived so that the desired order amount is zero or more when the desired order amount is subtracted from a fee obtained from the user (for example, a standard fee).

Subsequently, the service provider generates the running route plan in which a vehicle prepared with the own device is used according to the information transmitted in step S416 with reference to the service schedule information of the vehicle managed by the service provider and stored in the own device and derives a service cost when the generated running route plan is performed (step S418). Then, the service provider derives a desired order reception amount at which order reception is desired according to the derived a running cost and makes a bid for the order reception at the derived desired order reception amount (step S420). The desired order reception amount is derived according to, for example, the information in which the index indicating the running cost derived in step S418 and the desired order reception amount are associated.

Subsequently, the usage cost determiner 346 adopts a predetermined running route plan between the running route planes derived in steps S414 and S418 and registers information including the adopted running route plan as service management information in the storage 380. Then, the service manager 330A groups the users (step S422). For example, when the desired order reception amount for which the bid is made in step S420 is equal to or less than the desired order amount, the running route plan derived in step S418 is adopted. When the desired order reception amount for which the bid is made in step S420 is not equal to or less than the desired order amount, the running route plan derived in step S414 is adopted. For example, an amount obtained by subtracting the desired order amount or the desired order reception amount from the standard fee is a profit. As described above, the usage cost determiner 346 compares the running cost provided by the own device with the running cost presented by the service provider and corrects the running cost (usage cost) necessary to provide the service so that the supervisor of the own device obtains a profit.

The service provider determiner 348 may determine the service provider with reference to incentive information related to the destination. The incentive information is information in which a destination (for example, a facility or a store) of the use request and an incentive directly provided in accordance with the destination (for example, an income of an advertisement provided to the user by the ridesharing management device 300A) are mutually associated. For example when the destination providing the incentive is a destination of the user, the service provider determiner 348 performs a process of subtracting an amount associated with the incentive from, for example, the service cost (for example, the service cost of the own device) derived by the ridesharing management device 300A and provides the service by the ridesharing management device 300A to the user when an amount obtained by subtracting the amount subjected to the subtraction process from a standard amount is equal to or greater than a threshold (when it is determined that a predetermined profit is obtained). When the amount obtained by subjecting the amount subjected to the subtraction process from the standard amount is less than the threshold, the service provider determiner 348 may raise the standard amount and provide a service of another service provider to the user.

Subsequently, the service manager 330A determines a running route according to the service management information registered in the storage 380 (step S424) and transmits the determined running route to the terminal devices 100 of the grouped users (step S426). When the users give a settlement instruction to the terminal devices 100, the ridesharing system 1 performs a settlement process (step S428). For example, the ridesharing management device 300 performs settlement by requesting a settlement server (not shown) to perform the settlement by a credit card of the user registered in advance. When information for instructing the terminal device 100 to present another running route is transmitted to the service manager 330A in response to an operation on the terminal device 100 by the user, the service manager 330A corrects the route or the allocation of the vehicles. In this case, the process returns to step S414.

Figure 21:
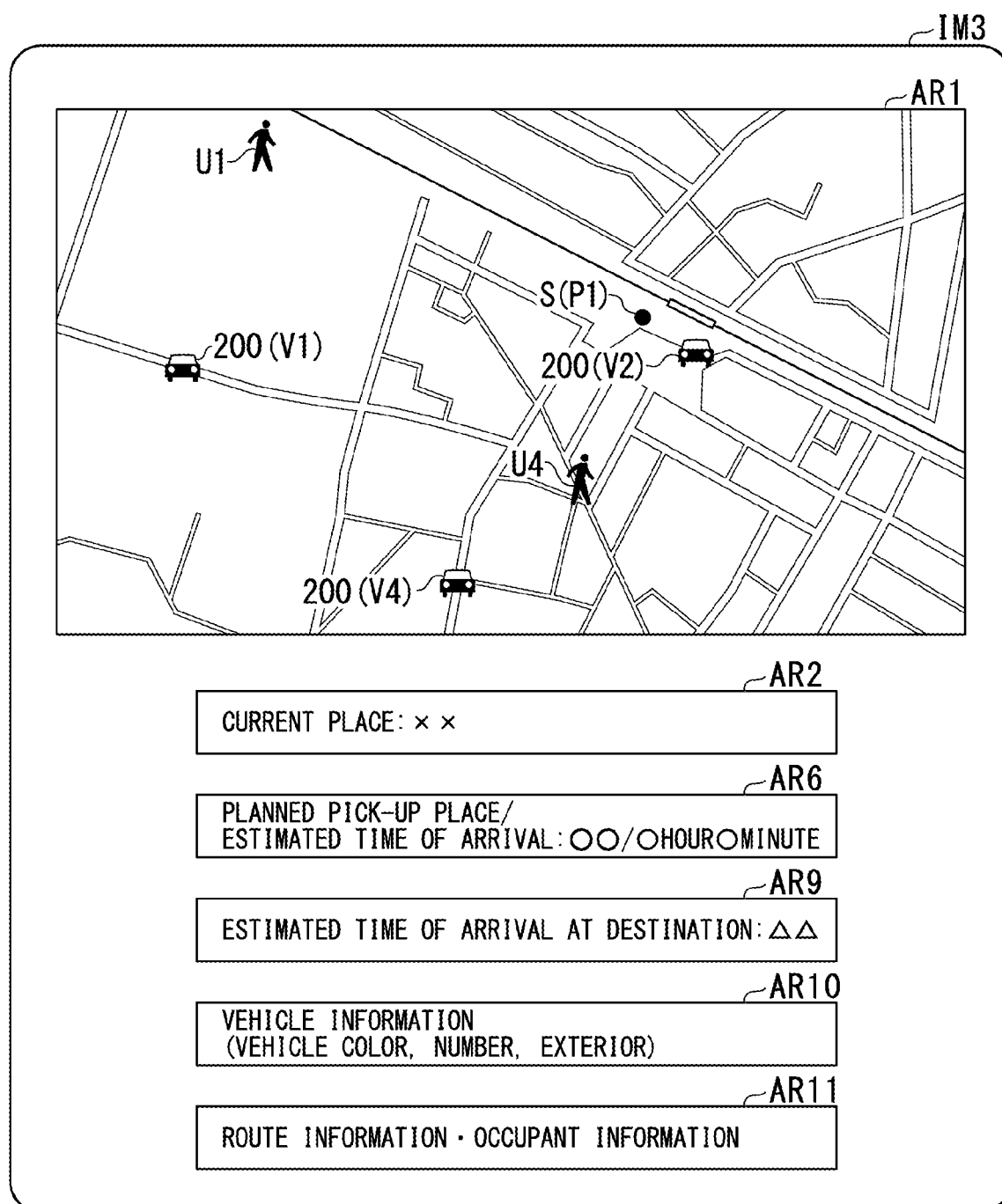
FIG. 21 is a diagram showing an example of an image IM3 including updated information.

When the settlement is performed in step S428, the service manager 330A provides information regarding the service to the user, as shown in FIG. 21 to be described below (step S430). Subsequently, the service manager 330A updates control information (step S432). The updating of the control information is notification of information regarding a place at which the user is picked up (or stands by) or information regarding the user (including the destination or a transit place) to the vehicle 200 scheduled for pick-up or the service provider. The user is notified of information indicating completion of allocate which is the control information (update information) or information such as a pick-up place, a pick-up time, and the like. Subsequently, the vehicle 200 performs a process to provide the service to the user, ends a task, or stands by according to the control information (step S434). For example, by causing the vehicle 200 to travel toward a meeting place with the user or deliver the user to the destination, the task ends or the vehicle 200 stands by at a predetermined position.

Subsequently, the ridesharing management device 300A performs event determination, updating of a status, updating of the service information, or display updating (step S436). For example, the ridesharing management device 300A updates a use state or positional information of the vehicle 200 (for example, updates a status), updates information regarding the user getting into the vehicle 200 or information regarding carried luggage (updates the service information), or transmits information to display the updated information to the terminal device 100 (updates display). When a request for a specific service is included in the use request and a timing at which the event of the specific service is performed (a timing at which shopping, haircut, or internal medical clinic is performed) arrives, the ridesharing management device 300A instructs the vehicle 200 to perform the event.

Then, the service (individual service) of the own vehicle of the service provider, the terminal device 100, and the ridesharing management device 300 ends (step S438) and the service of the ridesharing system 1 ends (step S440).

Figure 17:
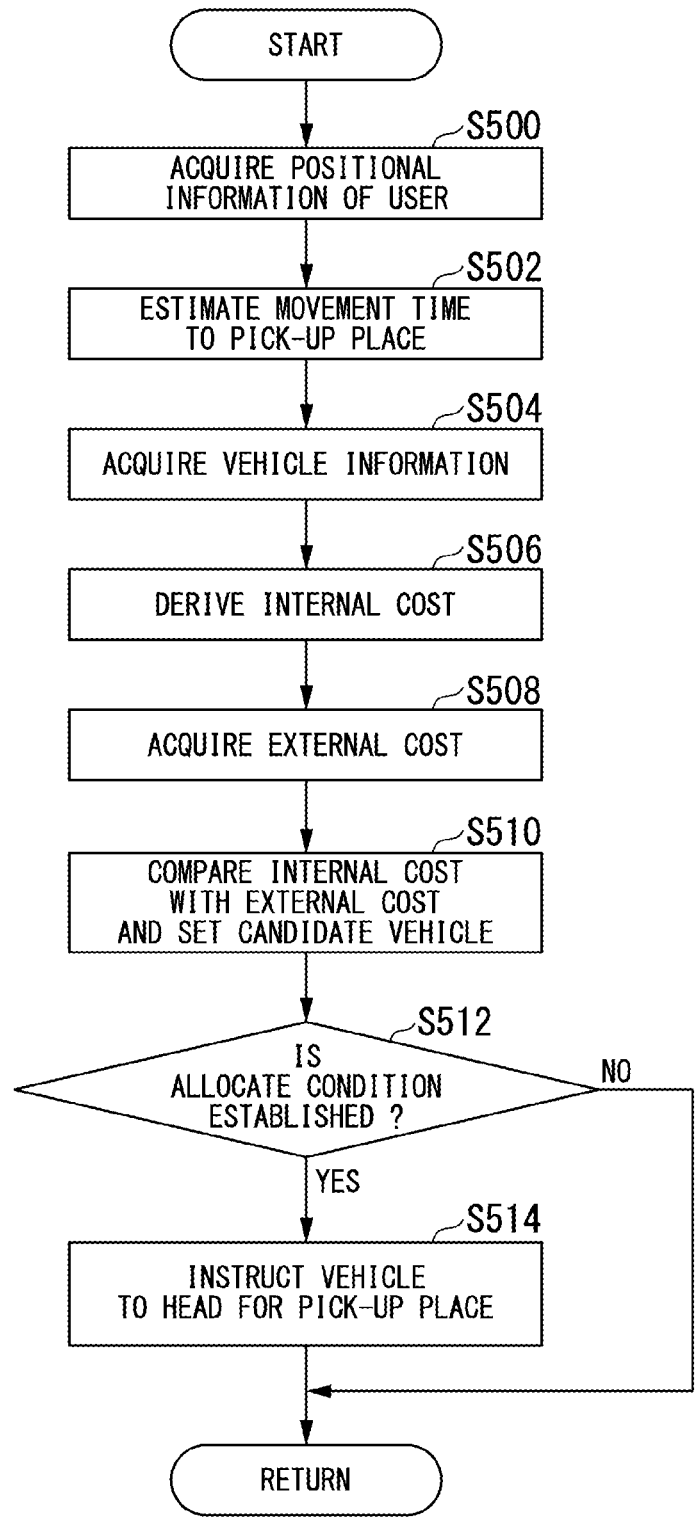
FIG. 17 is a flowchart showing a flow of a determination process of the picked-up vehicle 200 performed by the ridesharing management device 300 according to the second embodiment.

The ridesharing management device 300A according to the second embodiment may perform the following process so that the vehicle 200 heads for the pick-up place. FIG. 17 is a flowchart showing a flow of a determination process of the picked-up vehicle 200 performed by the ridesharing management device 300 according to the second embodiment. Description of a similar process to that of FIG. 9 will be omitted. In the process of the flowchart of FIG. 17, the ridesharing management device 300A is configured to set a candidate vehicle with reference to an external cost.

In step S504, the acquirer 320 acquires the vehicle information from the vehicle 200 (step S504). Subsequently, the service manager 330A derives an internal cost (step S508). For example, the internal cost is derived by performing a similar process to the process of step S414 of FIG. 16. The internal cost is a service cost when the service manager 330A performs the running route plane generated using the vehicle prepared with the own device with reference to the service schedule information 388.

Subsequently, the service manager 330A acquires an external cost (for example, a desired order reception amount) from the service provider (step S510). For example, the external cost is derived through similar processes to the processes of steps S416 and S418 of FIG. 16 described above.

Subsequently, the service manager 330A sets a candidate vehicle according to a result obtained by comparing the foregoing internal cost with the foregoing external cost, the acquired positional information of the user, and the acquired vehicle information (step S510). The candidate vehicle is (1)

a vehicle which can arrive at a time at which the grouped users are assumed to assemble at the pick-up place or at the pick-up place around the time and which can be used by the grouped user or (2) a vehicle which can provide the service at a lower cost between the internal cost and the external cost. Processes of steps S512 and S514 of FIG. 17 are similar to the processes of steps S208 and S210 of FIG. 9.

[Screen Displayed on Terminal Device]

Images IM1 to IM4 displayed on the display of the terminal device 100 when the ridesharing application 110 is executed will be described.

FIG. 18 is a diagram showing an example of the image IM1. When the user operates the terminal device 100, the image IM1 is displayed on the display. The image IM1 is displayed on the display when a use request is transmitted to the ridesharing management device 300A. The image IM1 includes a region AR1 including map information, a region AR2 indicating a current place of the user, a region AR3 indicating a desired pick-up place of the user, a region AR4 indicating the destination of the user, the service classification (use classification), and the number of use people, and a region AR5 including a use request execution button used to perform a process of transmitting the use request to the ridesharing management device 300A. The region AR1 includes, for example, map information in which a current position of the user or the desired pick-up place is associated. The user can change the map information of the region AR1 by performing a predetermined operation (a swiping operation, a pinch-in operation, or a pinch-out operation). For example, various kinds of information input through an operation on a keyboard displayed on the display by the user are displayed in the regions AR2 to AR4.

When the use request execution button is operated, the use request is transmitted from the terminal device 100 to the ridesharing management device 300A. FIG. 19 is a diagram showing another example of the use request. The use request is preset authentication information (for example, a user ID or an authentication key), history information of the current place (for example, a current place, a movement speed, and a direction), a desired pick-up place (desired pick-up place), the number of use people, and a service attribute (information regarding a service classification or use of a specific service).

The ridesharing management device 300A transmits information such as a running route to the terminal device 100 according to the use request. The information such as the running route is, for example, information such as a planned pick-up place at which the vehicle 200 joins the user, an estimated time of arrival at the planned pick-up place, an estimated time of arrival at the destination, and a use fee. Then, the information such as the running route is displayed on the display of the terminal device 100.

Figure 20:
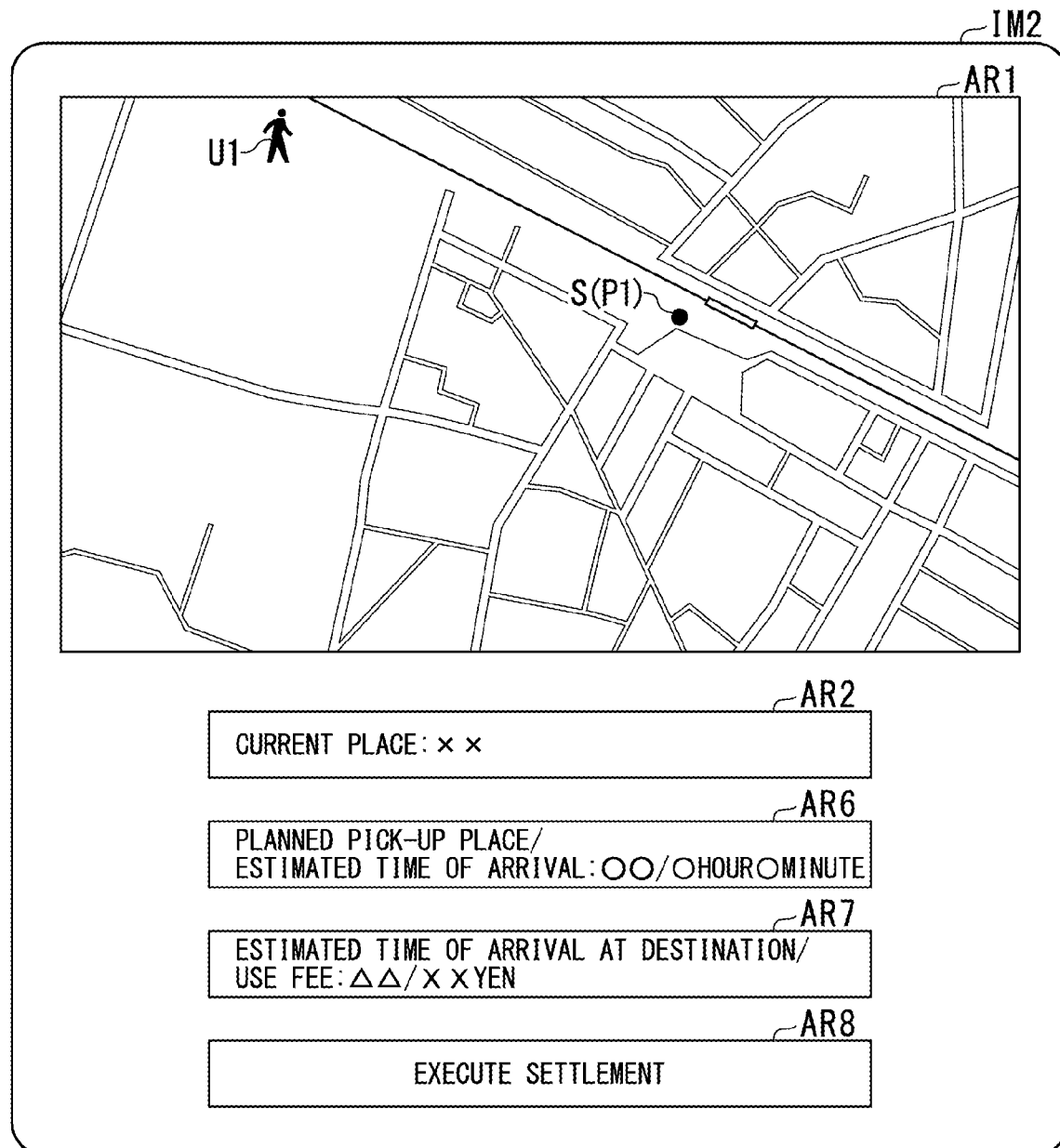
FIG. 20 is a diagram showing an example of an image IM2 including information such as a running route displayed on a display of the terminal device 100.

FIG. 20 is a diagram showing an example of the image IM2 including information such as a running route displayed on a display of the terminal device 100. The image IM2 includes regions AR6 to AR8 in addition to the region AR2. The region AR6 includes, for example, a planned pick-up place and an estimated time of arrival at the planned pick-up place. The region AR7 of the image IM2 includes, for example, an estimated time of arrival at the destination and a use fee. The region AR1 includes map information in which the planned pick-up place is associated.

The region AR8 includes a settlement execution button. When the settlement execution button is operated, the terminal device 100 transmits a signal for giving an instruction for settlement to the ridesharing management device 300A. Then, the ridesharing management device 300A executes settlement, updates the control information, and displays the updated information on the display of the terminal device 100.

FIG. 21 is a diagram showing an example of the image IM3 including updated information. The image IM2 includes regions AR9 to AR11 in addition to the regions AR2 and AR6. The region AR9 includes, for example, an estimated time of arrival at the destination. The region AR10 of the image IM2 includes, for example, information regarding the allocated vehicle for the user (color of a vehicle, a number of a number plate of the vehicle, the exterior of the vehicle, and the like). The region AR11 includes information regarding a route to a destination and information regarding occupants.

According to the above-described second embodiment, the ridesharing management device 300A can realize more efficient administration and can provide the service with high convenience for the user by determining the usage cost of a service provided to the user according to the desired pick-up place, the destination, and the service classification or correcting the usage cost according to the desired order reception information of the service provider.

According to the above-described embodiments, the ridesharing management device includes: the communicator 310 configured to communicate with the plurality of terminal devices 100 used by a plurality of users; the acquirer 320 configured to acquire pick-up requests of the plurality of users in which a use condition including at least a desired pick-up place is defined; and the service manager 330 configured to perform a grouping process of grouping users associated with the similar use conditions and an allocating process of allocating the vehicle 200 which is able to be used by the grouped users according to the use condition included in the pick-up request and configured to determine a pick-up place at which the allocated vehicle 200 is picked up so that the grouped users are able to be assembled according to results of the grouping process and the allocating process. Thus, it is possible to realize more efficient administration.

The ridesharing management device 300 may be mounted in the vehicle 200. When the vehicle 200 is a non-automated driving vehicle, the communicator 310 may communicate with a terminal device of a driver of the vehicle 200 via the network NW.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A ridesharing management device comprising:
a processor configured to:
communicate with a plurality of terminal devices used by a plurality of users;
acquire pick-up requests of the plurality of users in which a use condition including at least a desired pick-up place is defined;
perform a grouping process of grouping users into a collection of grouped users associated with the use condition and an allocating process of allocating a vehicle which is able to be used by the collection of grouped users according to the use condition included in the pick-up request, wherein the processor is configured to perform the grouping process and determine a pick-up place at which the vehicle is to pickup the collection of grouped users based on an estimated time of arrival at which a base user representing a priority user arrives at the desired pick-up place included in the use condition of the base user to assemble the collection of grouped users according to results of the grouping process and the allocating process, the base user further being a user serving as a standard and included in the plurality of users, and wherein the collection of grouped users, not including the base user, are assigned to the collection of grouped users based on a minimization of a summation of a group of costs associated with each user comprising the collection of grouped users, not including the base user, arriving at the pick-up place at the estimated time of arrival; and transmit the pick-up place and the estimated time of arrival to the plurality of terminal devices associated with the collection of grouped users, wherein an automatic driving device comprising one or more processors controls the vehicle allocated by the allocating process to travel to the pickup place and pick-up the collection of grouped users.

2. The ridesharing management device according to claim 1, wherein the processor is configured to determine the pick-up place by deriving indexes indicating a cost incurred for the collection of grouped users to arrive at candidate places and comparing the indexes for candidate places with one another.

3. The ridesharing management device according to claim 1, wherein the processor is configured to perform the grouping process according to the desired pick-up place of the plurality of users and a desired pick-up time included in the use condition.

4. The ridesharing management device according to claim 1,
wherein the processor is configured to communicate with the vehicle,
wherein the processor is configured to acquire positional information of the user, and
wherein the processor is configured to estimate an arrival situation at the desired pick-up place according to the positional information of the user, extract a vehicle candidate which is able to be used by the user according to the estimated arrival situation, and transmit updated information according to a variation in the positional information of the user to the user.

5. The ridesharing management device according to claim 1,
wherein the processor is configured to communicate with the vehicle,
wherein the processor is configured to acquire positional information of the user and positional information of the vehicle, and
wherein the processor is configured to update the pick-up place and a planned time of arrival of the vehicle according to the positional information of the user and the positional information of the vehicle.

6. The ridesharing management device according to claim 1,
wherein, when a desire to use the vehicle by a user without a reservation not included in a schedule of the vehicle is detected, the processor is configured to determine whether the user without a reservation is allowed to use the vehicle, and when the processor is configured to determine that the user without a reservation is not allowed to use the vehicle, the processor is configured to prepare another vehicle different from the vehicle to correspond to the desire to use the vehicle.

7. A ridesharing management device comprising:
a processor configured to:
communicate with a plurality of terminal devices used by a plurality of users;
acquire pick-up requests of the plurality of users in which a use condition including at least a desired pick-up place, a service classification used by the user, and a destination is defined;
perform a grouping process of grouping users into a collection of grouped users associated with the use condition and an allocating process of allocating a vehicle which is able to be used by the collection of grouped users according to the use condition included in the pick-up request and determine a pick-up place at which the vehicle is to pickup up the collection of grouped users according to results of the grouping process and the allocating process, wherein the grouping process comprises determining the pick-up place for the collection of grouped users to assemble based on an arrival time of a priority user arriving at the desired pick-up place, wherein each user of the collection of grouped users is assigned to the collection of grouped users based on a minimization of a summation of costs associated with each user included in the collection of grouped users arriving at the pick-up place at an estimated time of arrival;
determine a service classification according to the pick-up request;
determine a usage cost of a service provided to the user according to the desired pick-up place, the destination, and the service classification; and
transmit the pick-up place and the estimated time of arrival to the plurality of terminal devices associated with the collection of grouped users,
wherein an automatic driving device comprising one or more processors controls the vehicle allocated by the allocating process to travel to the pickup place and pick-up the collection of grouped users.

8. The ridesharing management device according to claim 7, further comprising:
determine a service provider that provides a service to the user according to the service classification; and
present order information for requesting the service provider to order provision of the service
wherein the processor corrects the usage cost according to desired order reception information in accordance with the order information.

9. The ridesharing management device according to claim 8, wherein the processor is configured to determine the service provider with reference to the desired order reception information presented by the service provider or incentive information related to the destination.

10. The ridesharing management device according to claim 1, wherein the vehicle is an automated driving vehicle.

11. A ridesharing management device comprising:
a processor configured to:
communicate with a plurality of terminal devices used by a plurality of users;
acquire pick-up requests of the plurality of users in which a use condition including at least a desired pick-up place is defined; and
perform a grouping process of grouping users into a collection of grouped users associated with the use condition and an allocating process of allocating a vehicle which is able to be used by the collection of grouped users according to the use condition included in the pick-up request and determine a pick-up place at which the vehicle is to pickup collection of grouped users according to results of the grouping process and the allocating process, wherein the grouping process comprises determining the pick-up place for the collection of grouped users to assemble based on an arrival time of a priority user arriving at the desired pick-up place, wherein each user of the collection of grouped users is assigned to the collection of grouped users based on a minimization of a summation of costs associated with each user included in the collection of grouped users arriving at the pick-up place at an estimated time of arrival, wherein, when a desire to use the vehicle by a user without a reservation not included in a schedule of the vehicle is detected, the processor is configured to determine whether the user without a reservation is allowed to use the vehicle, and when the processor is configured to determine that the user without a reservation is not allowed to use the vehicle, the processor is configured to prepare another vehicle different from the vehicle to correspond to the desire to use the vehicle; and transmit the pick-up place and the estimated time of arrival to the plurality of terminal devices associated with the collection of grouped users, wherein an automatic driving device comprising one or more processors controls the vehicle allocated by the allocating process to travel to the pickup place and pick-up the collection of grouped users.

12. A ridesharing management device comprising:
a processor configured to:
communicate with a plurality of terminal devices used by a plurality of users;
acquire pick-up requests of the plurality of users in which a use condition including at least a desired pick-up place is defined;
perform a grouping process of grouping users into a collection of grouped users associated with the use condition and an allocating process of allocating a vehicle which is able to be used by the collection of grouped users according to the use condition included in the pick-up request and determine a pick-up place at which the vehicle is to pickup the collection of grouped users according to results of the grouping process and the allocating process, wherein the grouping process comprises determining the pick-up place for the collection of grouped users to assemble based on an arrival time of a priority user arriving at the desired pick-up place, wherein each user of the collection of grouped users is assigned to the collection of grouped users based on a minimization of a summation of costs associated with each user included in the collection of grouped users arriving at the pick-up place at an estimated time of arrival, wherein the processor is configured to estimate the estimated time of arrival at which the collection of grouped users arrive at the desired pick-up place and perform the process of allocating the vehicle which is able to be used by the user according to the estimated time of arrival; and transmit the pick-up place and the estimated time of arrival to the plurality of terminal devices associated with the collection of grouped users, wherein an automatic driving device comprising one or more processors controls the vehicle allocated by the allocating process to travel to the pickup place and pick-up the collection of grouped users.

13. A ridesharing management method causing a computer to:
communicate with a plurality of terminal devices used by a plurality of users;
acquire pick-up requests of the plurality of users in which a use condition including at least a desired pick-up place is defined;
perform a grouping process of grouping users into a collection of grouped users associated with the use condition and an allocating process of allocating a vehicle which is able to be used by the collection of grouped users according to the use condition included in the pick-up request;
perform the grouping process and determine a pick-up place at which the vehicle is to pickup the collection of grouped users based on an estimated time of arrival at which a base user representing a priority user arrives at a desired pick-up place included in the use condition of the base user to assemble the collection of grouped users according to results of the grouping process and the allocating process, the base user being a user serving as a standard and included in the plurality of users, wherein the collection of grouped users, not including the base user, are assigned to the collection of grouped users based on a minimization of a summation of a group of costs associated with each user comprising the collection of grouped users, not including the base user, arriving at the pick-up place at the estimated time of arrival; and transmit the desired pick-up place and the estimated time of arrival to the plurality of terminal devices associated with the collection of grouped users, wherein an automatic driving device comprising one or more processors controls the vehicle allocated by the allocating process to travel to the pickup place and pick-up the collection of grouped users.

14. A ridesharing management method causing a computer to:
communicate with a plurality of terminal devices used by a plurality of users;
acquire pick-up requests of the plurality of users in which a use condition including at least a desired pick-up place, a service classification used by the user, and a destination is defined;
perform a grouping process of grouping users into a collection of grouped user associated with the use condition and an allocating process of allocating a vehicle which is able to be used by the collection of grouped users according to the use condition included in the pick-up request and determine a pick-up place at which the vehicle is to pickup the collection of grouped users according to results of the grouping process and the allocating process, wherein the grouping process comprises determining the pick-up place for the collection of grouped users to assemble based on an arrival time of a priority user arriving at the pick-up place, wherein each user of the collection of grouped users is assigned to the collection of grouped users based on a minimization of a summation of costs associated with each user included in the collection of grouped users arriving at the pick-up place at an estimated time of arrival;

determine a service classification according to the pick-up request;
determine a usage cost of a service provided to the user according to the desired pick-up place, the destination, and the service classification; and
transmit the pick-up place and the estimated time of arrival to the plurality of terminal devices associated with the collection of grouped users,
wherein an automatic driving device comprising one or more processors controls the vehicle allocated by the allocating process to travel to the pickup place and pick-up the collection of grouped users.

\* \* \* \* \*